DIGITAL TO ANALOG DECODER

Filed Feb. 9, 1960 8 Sheets-Sheet 1

INVENTORS
HENRY P. KILROY
JAMES O. McDONOUGH
JOHN O. MORIN
BY Kenway, Jenney, Witter & Hildreth
ATTORNEYS March 23, 1965 H. P. KILROY ETAL 3,175,138

DIGITAL TO ANALOG DECODER

Filed Feb. 9, 1960 8 Sheets-Sheet 2

INVENTORS
HENRY P. KILROY
JAMES O. McDONOUGH
JOHN O. MORIN
BY Kenway, Jenney, Witter & Hildreth
ATTORNEYS INVENTORS
HENRY P. KILROY
JAMES O. McDONOUGH
JOHN O. MORIN
BY Kenway, Jenney, Witter & Hildreth
ATTORNEYS

DIGITAL TO ANALOG DECODER

Filed Feb. 9, 1960 8 Sheets-Sheet 4

INVENTORS
HENRY P. KILROY
JAMES O. McDONOUGH
JOHN O. MORIN
BY Kenway, Jenney, Witter & Hildreth
ATTORNEYS

DIGITAL TO ANALOG DECODER

Filed Feb. 9, 1960 8 Sheets-Sheet 5

*INVENTORS*
HENRY P. KILROY
JAMES O. McDONOUGH
JOHN O. MORIN
BY Kenway, Jenney, Witter & Hildreth
ATTORNEYS INVENTORS
HENRY P. KILROY
JAMES O. McDONOUGH
JOHN O. MORIN
BY Kenway, Jenney, Witter & Hildreth
ATTORNEYS March 23, 1965 H. P. KILROY ETAL 3,175,138

DIGITAL TO ANALOG DECODER

Filed Feb. 9, 1960 8 Sheets-Sheet 7

INVENTORS
HENRY P. KILROY
JAMES O. McDONOUGH
JOHN O. MORIN
BY Kenway, Jenney, Witter & Hildreth
ATTORNEYS INVENTORS
HENRY P. KILROY
JAMES O. McDONOUGH
JOHN O. MORIN
BY Kenway, Jenney, Witter & Hildreth
ATTORNEYS

United States Patent Office 3,175,138
Patented Mar. 23, 1965

3,175,138
DIGITAL TO ANALOG DECODER
Henry P. Kilroy, Littleton, James O. McDonough, Concord, and John O. Morin, Bedford, Mass., assignors to Giddings & Lewis Machine Tool Company, Fond du Lac, Wis., a corporation of Wisconsin
Filed Feb. 9, 1960, Ser. No. 7,707
17 Claims. (Cl. 318—28)

Our invention relates generally to digitally controlled servomechanism and to novel apparatus for converting electrical signals containing information in digital form to corresponding analog signals. Apparatus which can accomplish this conversion will be referred to herein and in the claims as a "decoder." Our invention relates particularly to a system having a decoder in which the information contained in the digital signal appears, in analog form, as the relative phase of a pair of periodically varying electrical signals. Our invention further relates to digitally controlled servomechanisms utilizing our improved decoder for converting digital command signals to analog command signals for use by the servomechanism. As will be pointed out more fully below, our device is particularly applicable to servomechanisms which are required to position the member controlled by the servomechanism at a number of different commanded positions, the path traversed by the controlled member of the servomechanism in reaching these positions being unimportant to the operation of the device.

Automatic control of machine tools, industrial processes etc., has become increasingly important in recent years. When a manual operation such as positioning a drill press head at a particular location, or setting a valve at a precisely determined opening is to be taken over by a machine, a servomechanism is required. Typically this servomechanism will include, as one element, error measuring apparatus. An electrical signal representing the command signal is connected to the error measuring apparatus. An electrical signal, in the same form as the command signal which is generated by a feedback device associated with the controlled member is also connected to the error measuring apparatus. By the words "the same form" we mean that the signals must be the same except for differences therein caused by differences in position, rate of movement, acceleration, etc. of the controlled member. The feedback device generates an electrical signal corresponding to the position, rate of movement, etc. of the controlled member. If the actual position, rate of movement, etc. is different from that commanded, then an error signal is generated by the error measuring apparatus. This signal is amplified and applied to a servomotor which then repositions the controlled member, increases its rate of movement, etc. so that the error signal becomes zero, or substantially so.

From the foregoing description it is apparent that for any servomechanism the feedback signal and the command signal must be in the same form. Thus, where it is desired to command a servomechanism with a digital signal, one might provide a feedback signal which is also in digital form. While devices which measure a position, rate of movement, etc. of a controlled member and provide a digital signal corresponding to the measured parameter have been used prior to our invention, they are generally expensive, complex, and useful only for special purposes. Further, the amplifier and servomotors are responsive to analog signals and hence the digital error signal must be converted to an analog signal before being used to drive the output member.

For general purpose use it has been found more desirable to convert the digital command signal to an electrical signal one of whose parameters i.e. amplitude, relative phase, frequency, etc. contains the information of the digital signal. This analog signal may then be used as a command signal for a servomechanism employing feedback elements providing corresponding analog signals. Our invention relates principally to a decoder for converting a digital command signal to an analog signal; our decoder accepts command signals in digital form and provides a periodically varying signal as an output, the phase of the output signal with respect to a reference signal being uniquely related to the digital command signal.

Decoders for converting digital information to analog information are of major importance in all modern automatic control systems. The ease with which modern data processing systems can handle large volumes of information and generate commands based on this information is well-known. In almost all cases these data-processing systems are digital devices. The ease with which large amounts of digital information may be stored or transported indicates the desirability of providing a complex program in digital form. To utilize the command signals generated by these systems, for control of physical objects, the command signals must be decoded.

Decoders for this application have been made prior to our invention. In one type transformers are provided having a large number of taps. A selected combination of taps when connected to a synchro which forms part of a servo system may be used to provide a command signal for the servomechanism. Switches, which are controlled by the digital command signal, are connected between the tapped transformer and the synchro. For various digital inputs, various combinations of taps are connected to the synchro; for example, taps may be provided which when selected by the appropriate digital command signals provide synchro command signals for every 10° of synchro rotation. In this manner the digital command signal may be used to generate an analog command signal for the servomechanism.

While decoders of this type perform satisfactorily, their ability to position the output member at a number of different positions is limited, since for each different position of the synchro a different set of transformer taps is required. Further, with a single set of transformers it is not possible to have variation in system sensitivity e.g. a 1 and 36 speed system. Rather a completely separate set of transformers would be required. For these reasons, decoders of this type have not satisfied the need for decoders for servomechanism control.

Another type of decoder which has heretofore been used is the so-called "serial type." In these decoders a pulse generator serves as a common pulse source for a pair of identical divider chains or counters. The pulses from the source are fed to a first divider chain and provide a reference output. The pulses are also connected, through a "delete" circuit to the second divider chain. If no command signal is present, the pulses from the pulse source are connected through the "delete" circuit to the signal divider chain and the square wave output of the signal and reference dividers are identical in frequency and phase.

The command signal for a decoder of this type is a pulse train, the number of pulses representing the magnitude of the command signal. The pulse train representative of the command is connected to the "delete" circuit and one pulse to the signal divider chain is deleted for each pulse of the input signal. Thus the signal divider receives one less pulse than the reference divider for each command pulse. For each pulse deleted from the signal channel divider, it must await an extra pulse from the pulse source before it reaches the same condition as the reference divider. Thus the output square wave from the signal channel lags behind that of the reference channel by one pulse period for each pulse deleted by the command signal. The phase of the output signal with respect to the reference signal is thus a measure of the number of pulses in the command signal. As described above the phase of the generated signal with respect to the reference can only lag the reference signal. Apparatus may also be provided which will add pulses to the signal divider chain as well as delete them, thus providing both lagging and leading phase of the output signal with respect to the reference signal.

It is important to note however that the phase difference between output and reference signals may be changed only by one pulse interval at a time. For many applications this close control of the output signal phase is of great importance. For example, if a milling machine cutting head is being controlled, the contour which the head follows in shaping a part is of great importance. In this application, servomechanisms responsive to the phase difference between output and reference signals from decoders of the "serial" type can accurately and precisely control the contour followed by the milling machine cutting head. By properly selecting the size of digital commands and sequencing them in time to the decoders which generate command signals for the axis servomechanisms, an accurately shaped part may be produced.

However, in many applications, one desires to use a machine tool to perform an operation with the tool in a first location, and when this operation is completed, to move the tool to a different location where another operation is to be performed. The path that the tool takes in going from the first to the second location is unimportant. It is important however to move rapidly from one location to the next and to accurately position the controlled member at the new location. As previously noted, the rate of change of phase of the output signal with respect to the reference signal in a "serial" decoder is limited by the pulse rate. Thus no matter what speed capability the servomechanisms may have, the pulse rate sets an upper limit on how fast the controlled element may be moved from one position to the next. Another problem with "serial" decoders for this application is that they are "position sensitive" i.e. if it were desired to move from a point characterized by the three coordinates $x_1$, $y_1$, $z_1$, to a position $x_2$, $y_2$, $z_2$, a first set of signals $u_{12}$, $v_{12}$ and $w_{12}$ would be fed to the decoder. However if it were desired to move from another point characterized by the coordinates $x_3$, $y_3$, $z_3$ to the point $x_2$, $y_2$, $z_2$, a different set of signals $u_{32}$, $v_{32}$ and $w_{32}$ would have to be fed to the decoder. Thus, in making a digital program for such a device, the programmer must keep track of the position of the controlled member at all times. A given digital command in such a system is not unique to a position of the controlled member, but is unique to a distance and direction of movement. In contrast to the "serial" decoder, our invention provides a device which, in response to a given digital signal provides a command signal which commands the servos to position the controlled member, provide it with a velocity, acceleration, etc. which is unique to that command signal. This state of the controlled member is achieved regardless of its previous state. Further, when used to control the position of a machine tool, the tool may be moved rapidly from one position to the next, the only speed limitation being the ability of the servomechanisms to move the tool.

It is the general aim of the invention to provide an improved digitally controlled decoding servomechanism in which digital information is converted quickly and substantially instantaneously into a corresponding phase analog form by simple and reliable counting channels.

A related object of the invention is to provide such a decoding servomechanism which is particularly advantageous in automatic positioning systems in that it accepts absolute digital commands rather than incremental digital commands.

Another object is to provide a digital decoding servomechanism of the foregoing type which accepts commands representing successive order digits of a decimal number, thereby simplifying programming and the data handling apparatus.

It is a further object to provide such a digital decoding servomechanism capable of controlling a position or other variable over a wide range through the provision of coarse, medium or fine phase analog signals derived from counting channels.

Still another object is to provide an advantageous digital-to-phase analog decoding servomechanism in which counters are automatically returned to their original states following each complete sequence of operation, and in which the operation can thus be ascertained by digital checking circuits.

It is also an object to provide a digital decoding servomechanism in which a reference waveform is directly and simply derived from a reference counting channel as two component waves displaced 90° in phase for excitation of a phase shifting feedback device.

Other objects of our invention will in part be obvious and will in part appear hereinafter.

Our invention accordingly comprises the features of construction, combinations of elements, and arrangements of parts which will be exemplified in the constructions hereinafter set forth, and the scope of the invention will be indicated in the claims.

For a fuller understanding of the nature and objects of the invention, reference should be had to the following detailed description taken in connection with the accompanying drawings, in which:

FIG. 2(*b*) is a block diagram illustrating the interconnection between the decoder of FIG. 2(*a*) and the control apparatus associated with a position servomechanism;

FIG. 8(*a*) is a circuit of a novel single input switch circuit, such as is used in FIG. 2(*a*);

FIG. 8(*b*) is a circuit for a novel multiple input switch circuit such as is used in FIG. 2(*a*);

I. GENERAL DESCRIPTION

A. *Construction*

Figure 1:
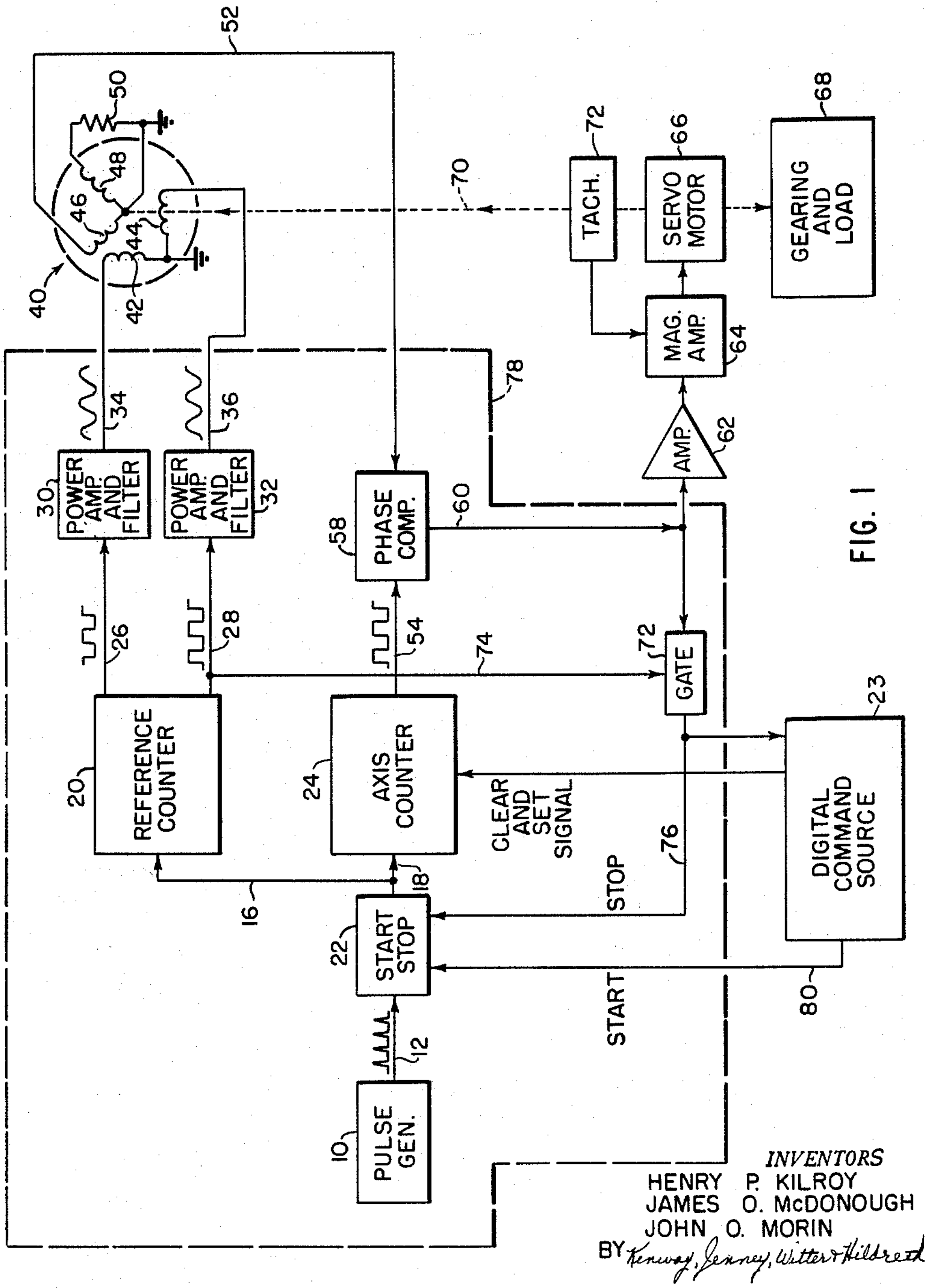
FIG. 1 is a block and line diagram of our improved decoder, and an associated servomechanism, this diagram illustrating a single channel decoder.

Before describing in detail a preferred embodiment of a digital to analog decoder made according to our invention, the general principles and an example of the operation of our decoder will be provided with reference to FIG. 1.

As shown in FIG. 1, we provide a pulse generator 10 which provides a pulse train, indicated by the wave form illustrated, on the output lead 12 from the pulse generator. The pulses appearing on lead 12 are connected through the start stop circuit 22 whose function will be hereinafter described to the axis counter 24 via lead 18 and to the reference counter 20 via lead 16. The reference and axis counters are substantially identical. These counters accept the pulses from the pulse generator 10 and divide them or count them down to provide square wave outputs, the zero crossings of the square wave output being determined by the number of pulses fed to the counter. Thus for example for every 100 pulses fed to the input of the counters they may change state once, thus generating an output square wave which is $\frac{1}{200}$ the frequency of the pulse input. In practice, we have found that it is desirable to provide an 80 kilocycle pulse generator i.e. one providing 80,000 pulses per second and that these are divided to provide 400 cycle square waves at the counter outputs.

It will be observed that the reference counter actually provides two direct outputs one on lead 26 and the other on lead 28. These two output wave forms are identical except that the waveform on lead 26 leads the output waveform on lead 28 by 90 degrees. The output signals from the reference counter appearing on leads 26 and 28 are connected as input signals to substantially identical power amplifier and filter circuits 30 and 32. The output of these two elements appearing on leads 34 and 36 respectively are 400 cycle sine waves which are 90 degrees out of phase. These two signals which are in time quadrature are used to excite two stator windings 42 and 44 of a phase shifting feed back device here shown as a conventional phase shifting synchro resolver 40. One terminal of each of the stator windings 42 and 44 is connected to a reference potential e.g. ground while the other end is excited by one of the two sine waves. The two rotor windings 46 and 48 of the synchro 40 are also in space quadrature. Winding 48 is connected across a resistor 50. One end of winding 46 is grounded and the other end provides an output on lead 52. The signal appearing between ground and lead 52 with the synchro connection shown has a phase with respect to the signal appearing on lead 36 which is directly related to the shaft angle of the synchro 40. Thus, as the shaft of synchro 40 is rotated through 360 degrees, the phase of the signal appearing on lead 52 with respect to the signal applied on lead 36 will also vary through 360 degrees. Thus the phase of the signal on lead 52 is a direct measure of synchro shaft angle. The magnitude of the signal appearing on lead 52 will not vary appreciably as the shaft of synchro 40 is rotated. To minimize any variation in amplitude of the signal appearing on lead 52, resistor 50 is provided so that the rotor winding not providing an output signal is connected to an essentially constant impedance. Thus the signal appearing on lead 52 generated by the rotor winding 46 is a measure of the synchro shaft position. This signal is compared with a four hundred cycle signal formed from a digital command signal which is also generated by the decoder and the difference signal is used to operate a conventional position servo to position the shaft of the synchro 40.

Before describing the manner in which the command signal is generated, it will be understood that the counter 24 includes input leads capable of performing two functions. In response to a signal fed to the counter, any number stored in the counter may be cleared i.e. the counter may be set to have no count set therein. Further, the counter is of the settable type i.e. by an appropriate energization of one or a combination of input leads, a given number may be set into the counter and the counter will start counting from that number forward. Thus, if the axis counter 24 were first cleared and then the number 100 were set into the counter, the counter would begin counting at 100. Thus, after the first 100 pulses from the pulse generator the counter would reach its full value and its output signal would change state i.e., from a low to a high value. If the reference counter started with a zero count, then the axis counter 24 would lead the reference counter 20 by 100 pulses or ½ a period. This condition would continue so long as the pulse generator continued to generate pulses and these were supplied to the axis and reference counters. The two square waves generated by the reference and axis counter would be 180 degrees out of phase. By setting numbers from 0 to 200 into the axis counter, the phase of the signal generated by the axis counter, hereinafter called the axis signal or command signal can be adjusted with respect to the reference counter in steps of $\frac{1}{200} \times 360°$ or in steps of 1.8 degrees.

It is important that both the reference counter and the axis counter start counting at the same time to preserve the phase difference which is represented by the initial setting of the axis counter. To this end, the start-stop circuit 22 is provided. The pulses from the pulse generator 10 are normally connected to the start-stop circuit from lead 12. However, the circuit is open until a signal is received from the digital command source 23 that the appropriate digital signal has been set into the axis counter 24. The start-stop circuit is then closed and pulses are fed to the reference counter 20 and the axis counter 24 simultaneously.

As noted above, the phase of the axis counter output square wave with respect to the reference counter square wave depends upon the number which has been set into the axis counter. The reference counter and the axis counter generate a pair of signals on leads 28 and 54 whose phase separation corresponds to the number initially set into the axis counter. The 400 cycle signal appearing on lead 52 is connected to the phase comparator 58. If the phase of the signal on lead 52 which is representative of the shaft angle of the synchro 40 is not identical with the signal appearing on lead 54, the phase comparator will generate an output signal. This signal is connected via lead 60 as an input signal to the amplifier 62 and from that amplifier as an input signal to the magnetic amplifier 64. The signal from magnetic amplifier 64 is connected to the servo motor 66 which drives the gearing and load, e.g., a movable member to be positioned, represented by the block 68. Also connected to the servomotor, either directly or through gearing is the shaft 70 of the synchro 40. A tachometer 72 is connected to the output shaft to provide a compensating signal to the amplifier 64. The shaft 70 will be rotated until the output of the phase comparator is zero, i.e., until the synchro shaft angle with respect to its stator is such that the phase of the signal on lead 52 is identical with that on lead 54.

It will be noted that the phase comparator output signal is connected as one input signal of the gate circuit 72. Another input to the gate 72 appears on lead 74 from the reference counter. The gate 72 includes a differentiating and clipping circuit to generate a pulse of appropriate polarity for each zero crossing of the signal on lead 28. The clipper removes half of these pulses so that only half of the pulses which represent zero crossings in one direction are useful in the gate 72 as input signals. The coincidence of a zero crossing of the signal on lead 28 and the zero signal from the phase comparator generates a stop signal on the output lead 76 from gate 72. This output signal is fed to the start-stop circuit 22 and also to the digital command source 23, the presence of the stop signal indicating that the servomechanism has positioned the shaft 70 in accordance with the digital input fed into the axis counter 24 and that the reference counter has a zero count. By utilizing the output signal from the reference counter to determine the time of occurrence of the stop signal, the decoder can always be stopped when the reference counter has a "zero" count therein. This means that in response to the next command, when the start-stop circuit 22 is opened again, the reference counter will always start with a zero count and the axis counter will stop at the count originally set into it. Although provision may be made to reset the reference counter to zero count before the start of each operating sequence (as hereinafter described) it is not strictly necessary to do this since that counter will stop with zero count at the end of each sequence. The fact that the axis counter should stop with the original count set in it, may be used to provide a check signal for proper system operation. Thus the digital equipment supplying the command signal to the decoder may also be programmed to supply the command to a short term storage. When the stop signal is received, the count of the axis counter (or counters) may be compared with the stored command to determine if the desired command has been executed. If there is a difference between the stored command and the decoder signal, then an error has occurred and an appropriate warning signal may be activated. This sequence may be programmed in the digital equipment supplying the command signals. The elements comprising our improved decoder as illustrated in FIG. 1 are contained within the dotted line 78.

B. *Operation*

The operation of the decoder and associated servomechanism of FIG. 1 in response to a command signal will now be described. It will be assumed initially that the decoder is in the "stop" condition with the start-stop circuit 22 preventing any pulses from pulse generator 10 being fed to either the reference counter or the axis counter. Following the receipt of the stop signal from the gate circuit 72, the digital command source 23 generates a clear signal which clears the axis counter 24, and following this generates a "set" signal corresponding to the desired angular position of the shaft 70. In the present instance, this could be a number anywhere from zero to 200 (assuming an 80 kilocycle pulse generator and a 400 cycle signal as described above). The command signal thus represents in digital form a number indicative of a desired position of the movable member or load. As will become apparent, this requires only the representation in decimal form of the values of the successive digits of a plural digit decimal number. After the command has been fed to the axis counter and the appropriate number is stored therein, a start signal is generated by the digital command source 23 on lead 80. This start signal closes the start-stop circuit and pulses from pulse generator 10 are fed to the axis and reference counters simultaneously. After the first 100 pulses are received, the reference counter output changes state from one state to the other and on the 200th pulse it changes back again, thus generating a 400 cycle square wave. As previously noted, one of the two output signals on the reference counter is 90 degrees out of phase with the other, and both of these output signals are fed to the synchro 40. Simultaneously, the axis counter begins generating an output signal but the phase of this output signal is shifted with respect to the output of the reference counter by an amount corresponding to the digital command which has been fed to the counter. Both the signal from the axis counter and the signal on lead 52 representing the shaft position are fed to the phase comparator 58, which generates an output signal on lead 60 depending upon this phase difference to operate the servomechanism in a conventional fashion. When the servo has driven the shaft 70 to its new position, the phase comparator output becomes zero, and this zero signal is fed to the gate 72. The next time there is a zero crossing in the proper direction on the lead 28, the gate 72 operates and generates a stop signal. The stop signal is fed to the start-stop circuit to stop further pulses being fed to the counters and it is also fed to the digital command source to indicate that the decoder is ready to receive the next command. The digital command source 23 then clears and sets the axis counter to the next command and following this generates a start signal to begin the sequence again.

It will be observed that the servomechanism drives the shaft 70 from one position to the next in accordance with the output of the phase comparator. It will also be observed that the servomechanism will drive to the next desired shaft position over the shortest possible route without regard to increments in shaft position. Thus, the decoder of our invention is responsive to a series of digital commands and each command represents a new position without reference to previous commands that may have been set to the decoder. Thus, our device is particularly useful in connection with high speed positioning of controlled members to particular desired positions.

II. SPECIFIC DESCRIPTION

A. *Pulse generator*

Figure 2A:
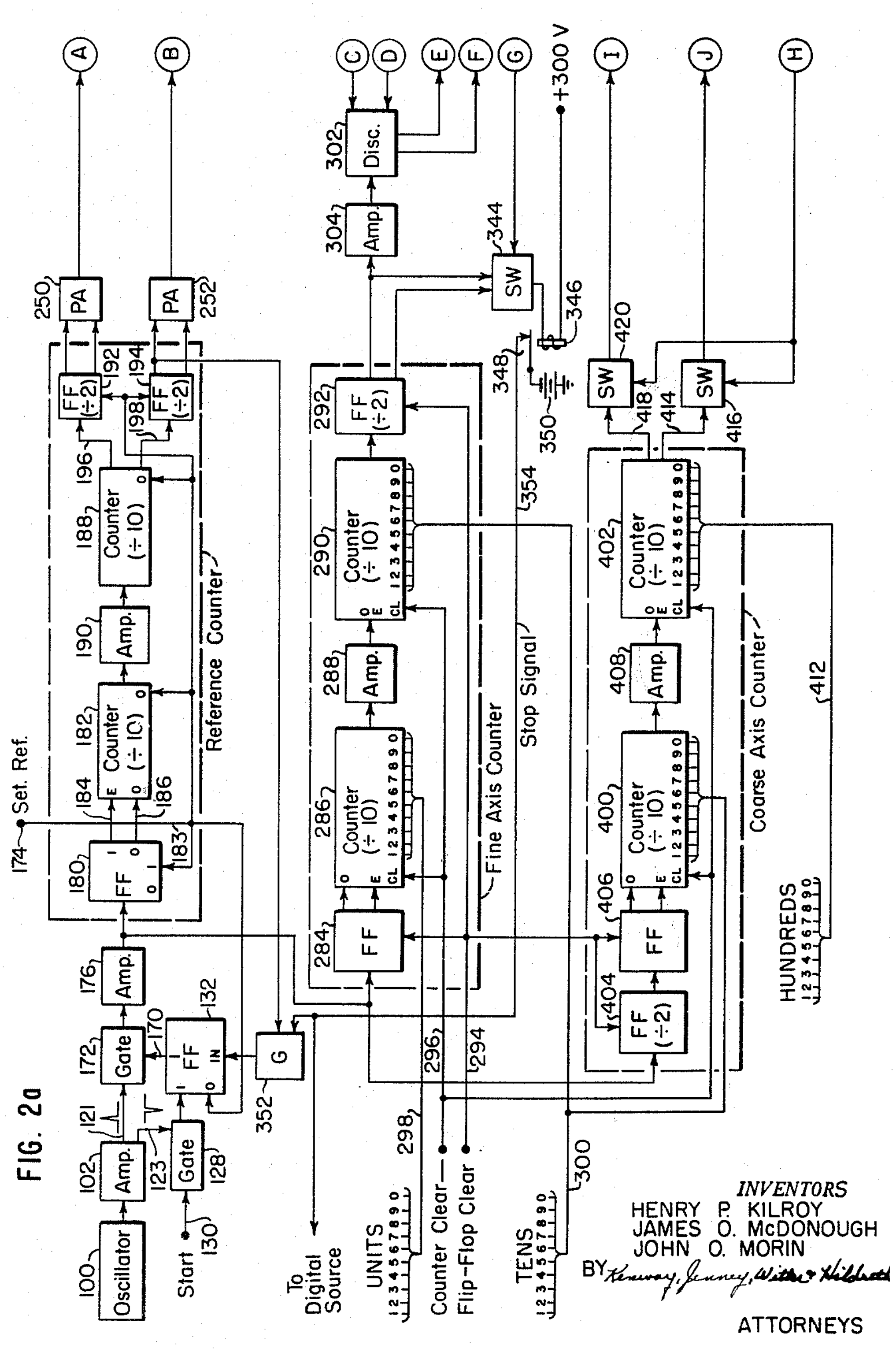
FIG. 2(*a*) is a more detailed block diagram of a multiple channel decoder made according to our invention.
Figure 2B:
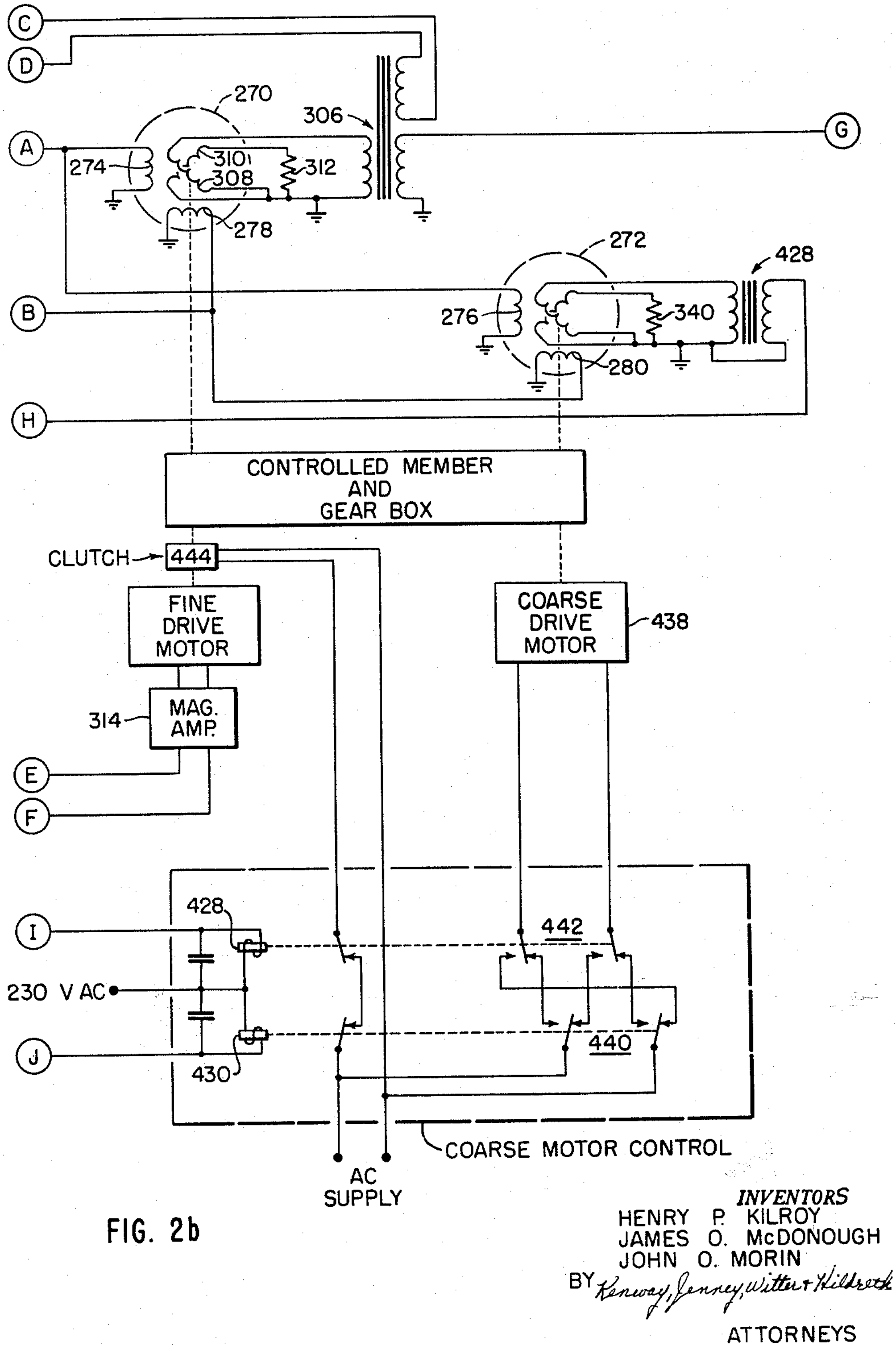
Figure 9:
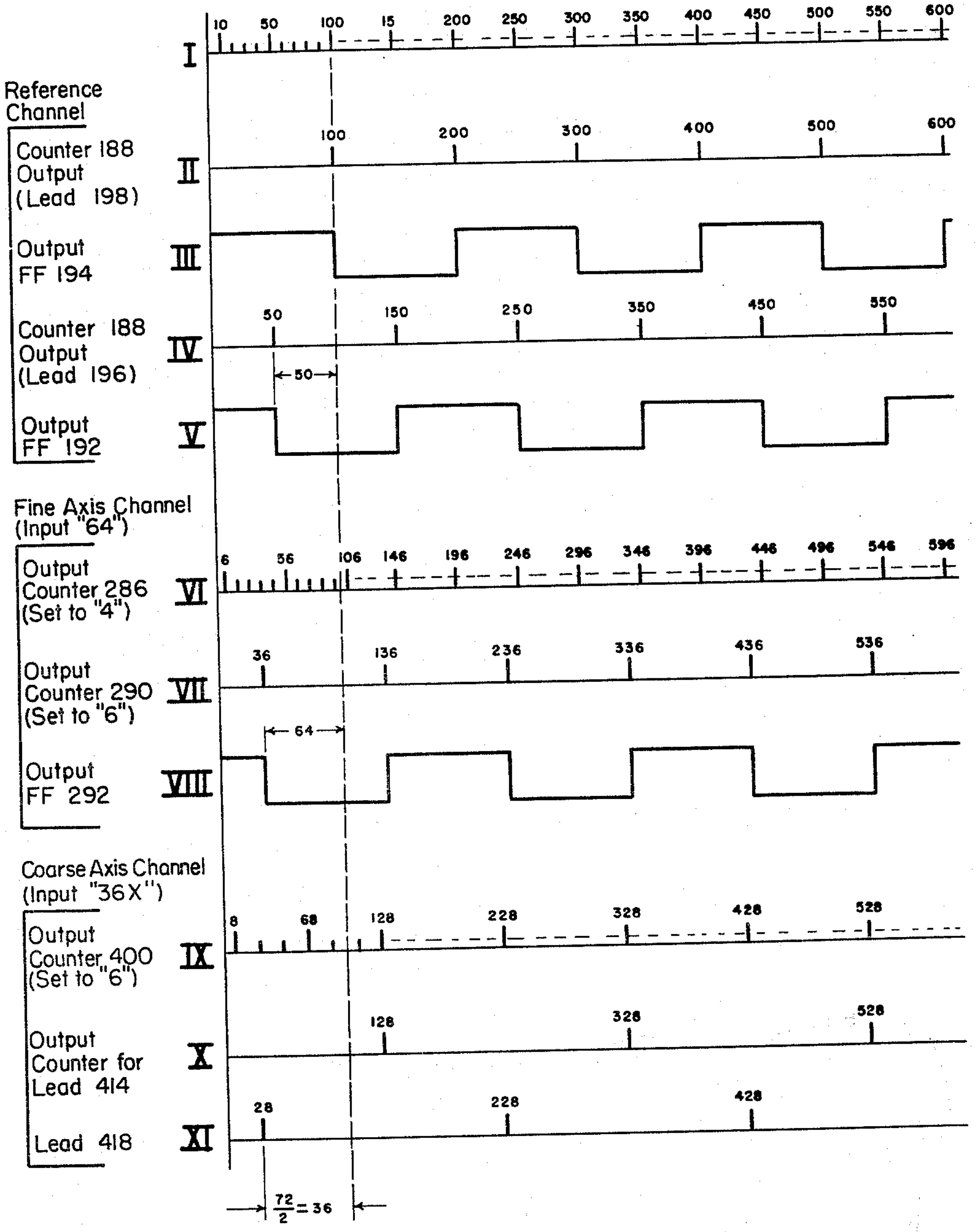
FIG. 9 is a timing diagram showing the time relationship of the signals generated by the decoder of FIG. 2(*a*)
Figure 10:
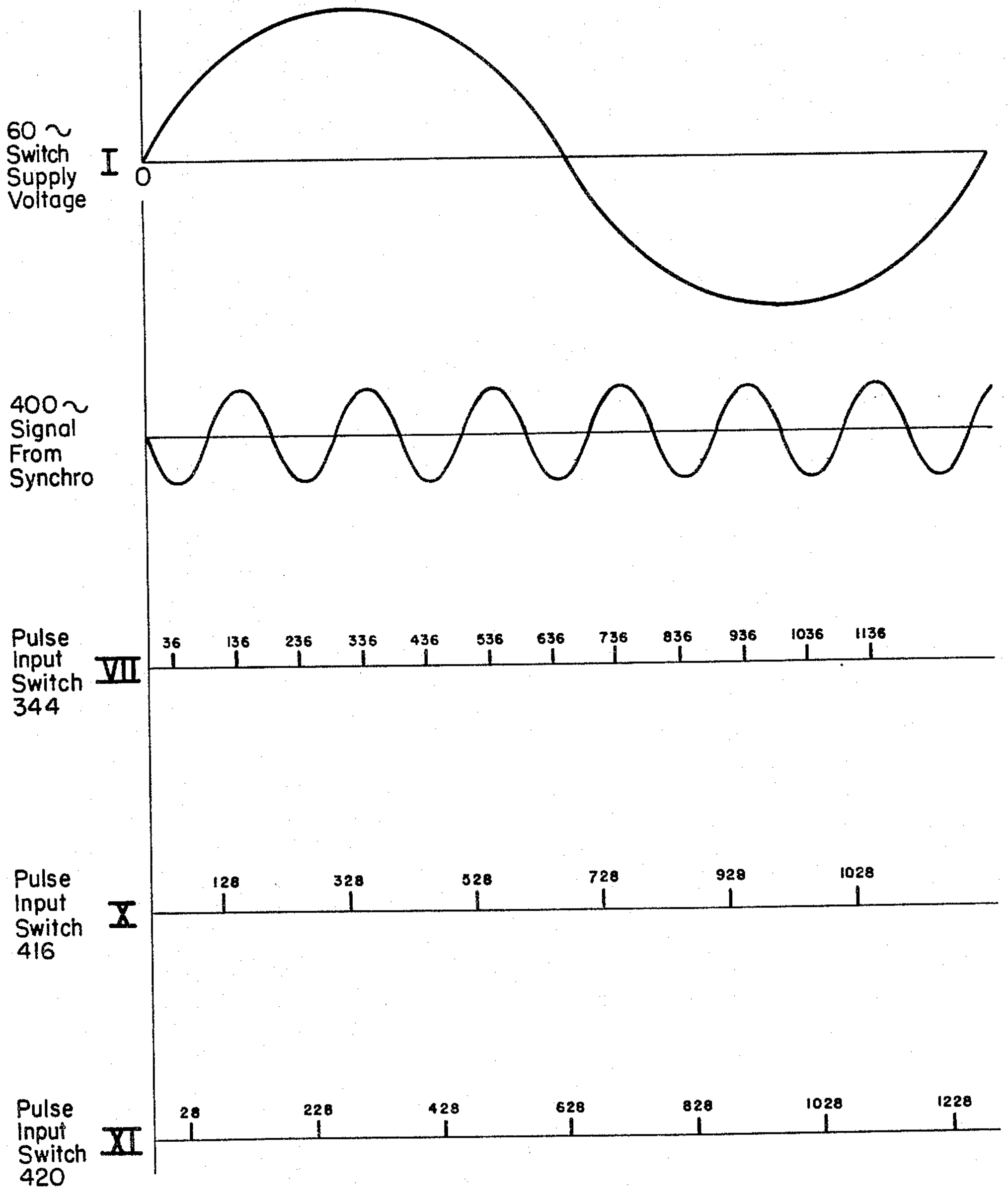
FIG. 10 is a timing diagram illustrating the operation of the switch circuits of FIGS. 8(*a*) and 8(*b*).

A more complete diagram of a digital servomechanism incorporating our decoder is illustrated in FIGS. 2*a* and 2*b*. FIGS. 3, 4, 5, 6, 7, 8*a* and 8*b* illustrate the components utilized in the circuit of FIG. 2A and FIGS. 9 and 10 are timing diagrams useful in explaining the operation of the decoder and phase sensitive switches.

Figure 3:
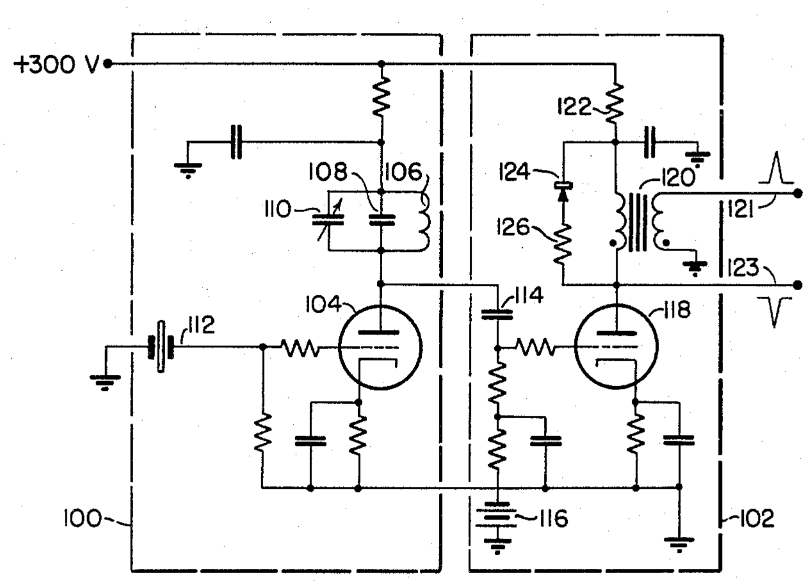
FIG. 3 is a schematic circuit diagram of an oscillator and pulse generator of the type which might be used in the decoder of FIG. 2(*a*)

The pulse generator 10 of FIG. 1 comprises an oscillator 100 and pulse amplifier 102 as shown in FIG. 2*a*. Typical circuit diagrams for these components are shown in FIG. 3. Thus, the oscillator 100 utilizes a triode vacuum tube 104 which is connected in the conventional tuned plate tuned grid configuration, the tuned circuit comprising the inductance 106 and the capacitors 108 and trimmer capacitor 110. A crystal 112 connected in the grid circuit of the triode 104 is utilized to stabilize the oscillator frequency at exactly 80 kilocycles. The oscillator circuit illustrated in FIG. 3 is otherwise conventional and is included herein for purposes of illustration only, it being understood that other types of conventional oscillator circuits might be used.

The oscillator output signal (a sine wave) is fed to the amplifier 102 via condenser 114 in FIG. 3, the condenser being connected to the grid circuit of triode 118. It will also be observed that a battery or other source of negative voltage 116 is connected to the grid of triode 118, thus biasing the grid to cutoff. Only the positive portions of the sine wave connected through capacitor 114 will be amplified by the triode 118 because of the negative grid bias. The plate load of triode 118 includes the transformer 120, the primary of which is connected in series with the plate of the triode and the plate voltage supply through resistor 122. The secondary winding of the transformer 120 provides one pulse output per cycle of the 80 kilocycle input sine wave. It will be observed that the amplifier 102 is a conventional pulse amplifier but is not a blocking oscillator. However, with different types of pulse generators, blocking oscillators might be used. We prefer to use this type of pulse amplifier to obtain substantial pulse power since, as will be explained, the pulse is fed to a large number of circuits in our decoder. Both triodes 104 and 118 have conventional cathode biasing. It will also be observed that a diode 124 in series with the resistor 126 is connected across the primary of transformer 120 to prevent ringing of the transformer due to inductive action with the corresponding development of pulse "overshoots."

It will be observed that two output leads are provided from the amplifier 102 one of which is the secondary of transformer 120 and one of which is connected directly to the plate of triode 118. Because of the phase reversal taking place between the plate of triode 118 and the secondary of transformer 120, the pulses appearing on these two leads will be of opposite polarity as indicated by the pulse wave forms associated therewith.

B. *Start-stop circuits*

Reference is now made to FIG. 2*a*. It will be observed that the pulses appearing on lead 123 are fed directly to a gate circuit 128 to which is connected the start signal from the digital command source on lead 130. The gate 128 is normally closed but is opened when a start signal is present on the lead 130. It will be apparent that different types of gate circuits may be utilized depending upon the type of signal which is present on the lead 130. Such gate circuits are well known to those skilled in the art and will not be specifically described herein. However, when a signal is present on the lead 130 the pulse appearing on lead 123 for each cycle of oscillator 100 is connected through the gate circuit to the "1" input of the flip-flop 132.

Figure 4:
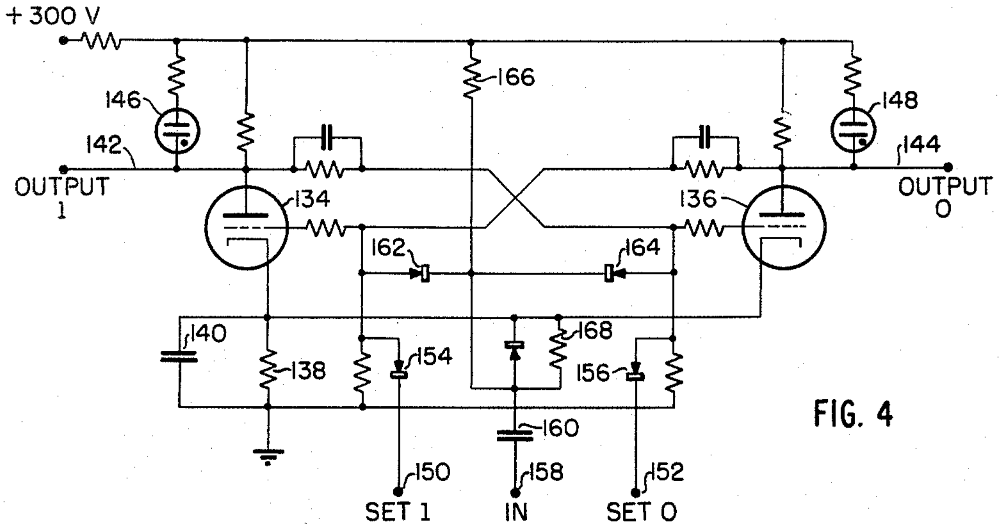
FIG. 4 is a schematic circuit diagram of a settable flip-flop such as might be used in the decoder of FIG. 2(*a*)

A typical circuit which might be used for flip-flop 132 is illustrated in FIG. 4. The flip-flop of FIG. 4 is a conventional cathode coupled multivibrator using triode vacuum tubes 134 and 136. The cathodes of the tubes are connected to ground through a common cathode resistor 138 which is paralleled by the usual by-pass capacitor 140. Three input leads and two output leads are provided. Output lead 142, labeled "output 1" has a voltage which is high or "up" when the flip-flop is in the "1" state and output lead 144 has its highest potential when the flip-flop is in the "0" state. The "1" state of the flip-flop is characterized by tube 134 being cut-off and tube 136 conducting while the reverse is true for the "0" state. Thus indicator light 146 which is connected across the plate resistor of tube 134 is lighted when tube 134 is conducting; hence it lights when the flip-flop is in the "0" state. Similarly indicator 148 lights when the flip-flop is in the "1" state.

In the decoder of our invention, it is desirable to be able to set the flip-flop to one state or the other as will be apparent from the description below. To this end, "Set 1" and "Set 0" input terminals 150 and 152 are provided. These terminals are connected, via diodes 154 and 156 to the grid circuits of tubes 134 and 136. A negative pulse applied to terminal 150 for example will set the flip-flop to the "1" state because it is applied through the diode to the grid of tube 134. It will be recalled that in a cathode coupled multivibrator, the grid of the tube which is conducting is at the cathode potential, while the grid of the cut-off tube is connected to the plate of the conducting tube and is therefore held below the cathode potential, thus holding the tube cut-off. If the flip-flop is in the "1" state with tube 134 cut-off negative pulse applied to its grid circuit through diode 154 will not affect it and the circuit will remain in the "1" state. However, if tube 134 is conducting, a condition which characterizes the "0" state, the pulse will cause the current through the tube to diminish. By conventional multivibrator action this current diminution will be regenerative and the circuit will change state. A negative pulse applied to the "Set 0" terminal will similarly set the circuit of FIG. 4 to the "0" state.

When it is desired to change the flip-flop from one state to the other, a negative pulse may be supplied to the "In" terminal 158. This pulse is coupled through capacitor 160 to the junction of the two diodes 162 and 164 which are also connected respectively to the grid circuits of the tubes 134 and 136. Since the negative pulse is applied to both tubes it will cut-off the one which is conducting and by conventional multivibrator action turn the other tube on. The condenser 160 isolates the circuit of FIG. 4 from the direct voltage level of the pulse source. Direct voltage bias is provided for diodes 162 and 164 by resistors 166 and 168. While FIG. 4 illustrates a typical flip-flop circuit which might be used in our invention, other known circuits including transistor circuits may also be used if desired.

The reader should again refer to FIG. 2*a*. As shown, when the "start" signal is fed to the gate circuit 128, negative pulses from amplifier 102 are fed to the "Set 1" input of flip-flop 132, which then provides a positive signal at the "1" output terminal. This signal is connected via lead 170 to gate 172, and serves to open the gate and pass the positive pulses from amplifier 102. It will be noted that the "Set 0" input terminal of flip-flop 132 is connected to the "Set Reference" input terminal 174 of the decoder. As will be explained below, a signal is supplied on this lead after one command has been executed, but before the initiation of another command. Thus, prior to the opening of gate 128 by the "Start" signal, flip-flop 132 is in the "0" state and gate 172 is closed. The first pulse from amplifier 102 serves to open the gate 172 and supply pulses to the decoder. The pulses passed through gate 172 are further amplified by amplifier 176 and supplied to the counter channels of the decoder.

C. *Counting channels*

In the decoder illustrated in FIG. 2*a* three counting channels are provided—a reference counter, a fine axis counter and a coarse axis counter. As previously explained the reference counter provides the reference signal against which the phase of the other signals are measured. This signal is used to excite the synchros which measure the position of the controlled member. The axis counters provide the signals which are compared with the synchro output signals to determine the direction and amount of movement necessary to bring the controlled member to the position corresponding to the command signal.

While we have illustrated only a coarse and fine channel, it is obvious that the number of channels may be increased to obtain varying degrees of sensitivity as desired. Further, we have illustrated circuitry for only a single axis control. Multiple axis control may be provided by duplicating the axis counters for a second and third axis if desired. These additional channels and axes have not been illustrated since their operation will be clearly apparent from the description hereinafter given.

D. *The reference counter*

As shown in FIG. 2*a*, the reference counter includes a flip-flop 180 of the type described; negative pulses from amplifier 176 are connected to the input terminal of flip-flop 180; thus causing it to change state at the pulse rate. Both the "1" and "0" outputs of the flip-flop are used, the "1" output being fed to the "even" input of counter 182 on lead 184 and the "0" output to the "odd" input to counter 182 on lead 186. It will be observed that lead 183 from the "Set Reference" terminal 174 on which a signal is provided by the digital information source prior to each command is connected to the "Set 1" input of the flip-flop 180. Thus the first pulse appearing at the input of the counter will cause flip-flop 180 to change from a "1" to a "0" state and provide an initial input on the "odd" input terminal of counter 182. A second counter 188 is also provided which is substantially identical to counter 182 and an amplifier 190 interconnects them. Counters 182 and 188 are decade counting devices, i.e. each divide by 10 and, when cascaded or connected in tandem as shown, divide by 100. Two output signals are provided by counter 188 which are 90° out of phase and these two signals are fed as inputs, via leads 196 and 194 to the flip-flops 192 and 194. These flip-flops divide the signals applied to their input by 2, thus providing a total division by 200 in the reference counter.

The "Set Reference" signal is connected to the "Set to 0" input of each of the counters 182 and 188 so that the counters are "Set to 0" prior to beginning a count. The flip-flops 192 and 194 are also set to the "0" state before generation of the reference signal begins. Thus, the entire reference counter is in the "0" state when the first pulse from the pulse source causes the flip-flop 180 to change state.

Figure 5:
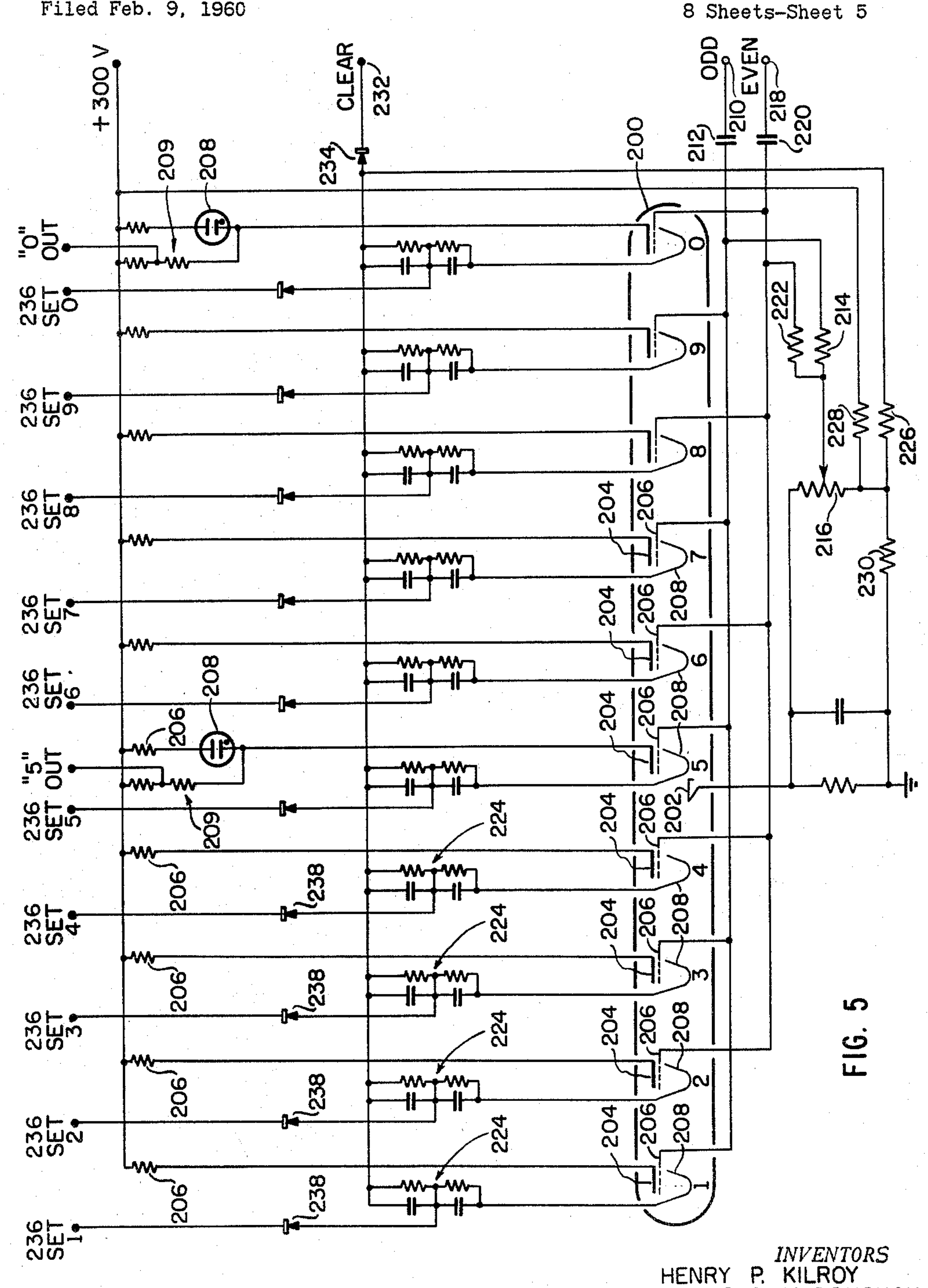
FIG. 5 is a schematic circuit diagram of a settable counter such as might be used in the decoder of FIG. 2(*a*)

A typical circuit for the counters 182 and 188, as well as the counters used in the axis counters is illustrated in FIG. 5. In connection with the description of the counter of FIG. 5, reference will be made to the "Set" inputs which can set a given number into the counter. These "Set" inputs are not required for the reference counters, except for the "0 set." However, the counters used in the reference channel are identical to the counters illustrated in FIG. 5 except for this feature, and the more general construction used in the axis counter channels will be described.

The counter 182 is a decade counting device, preferably in the form of an electron discharge tube 200 known as a decade scaling tube and having a single cathode 202 and 10 different targets 204. A grid 206 is associated with each target, as is a fourth element termed a "spade" 208 whose purpose will be described below. The cathode is located in the center of a cylindrical cavity and the targets are located about the periphery with the grids and spades associated with the targets. A magnetic field is provided which extends axially of the cavity, thus causing electrons to spiral outwardly from the cathode to the targets. Each of the targets 204 is returned to a positive voltage supply through a target resistor 206, thus attracting electrons emitted by the heated cathode. The target circuits of the "5" and "0" targets include an indicator light 208 and a voltage divider circuit 209 to which an output terminal is connected. All of the grids associated with the "odd" targets are connected together and to the "odd" input terminal 210 through capacitor 212. A grid return is provided through resistor 214 which is connected to the cathode through the grid bias potentiometer 216. All the "even" grids are similarly connected to the "even" input terminal 218 through capacitor 220, the resistor 222 providing the grid return.

A resistor-capacitor network 224 is associated with each of the spades of the configuration shown. The input terminals of each of the networks are connected in common through resistor 226 to a positive bias voltage supplied from the voltage divider including resistors 228 and 230. The spades are also connected in common to the "Clear" input terminal 232 through diode 234. An individual "Set" terminal 236 is provided for each spade, the terminals being connected to the network 224 through the diodes 238.

When power is applied to the tube all spades are at a common potential and all grids are at a common potential. The spades are connected through the diodes 238 to a source of potential above that supplied by the bias source so that the diode 238 is cut off. No well defined beam of electrons is formed. If a negative signal is applied to one of the "Set" terminals, the potential of the spade associated with this terminal will drop with respect to the other spades and a defined beam of electrons will be attracted to it and to its associated target. In this manner a beam of electrons is formed between the cathode and a single target, as for example the "0" target. If now a negative pulse is supplied on the "even" input terminal 218, the internal construction 212 of the tube 200 is such that the electron beam on the "0" target will shift to the "1" target. If the next succeeding negative pulse is supplied on the "odd" terminal the beam will shift from the "1" target to the "2" target etc. the negative pulse serving to cut off the current flow to the even or odd targets as the case may be and the beam being thereby shifted to the next adjoining target. It will be recalled that in FIG. 2*a* the odd and even inputs to counter 182 are connected to the output terminals of flip-flop 180. The capacitors 212 and 220, and resistors 214 and 222 respectively serve to differentiate the output of the flip-flop and supply pulses to the respective sets of grids. At low pulse frequencies e.g. 8 kcs. it is not necessary to pulse the two sets of grids separately and they may be connected in common.

Thus the beam is switched from target to target by a pulse train applied to the input terminals, being applied to any given plate once for each ten pulses applied. The voltage at the "0" output terminal 240 will thus drop once for each ten pulses fed to the odd or even input terminal; as will be explained below it is desirable also to provide an output terminal associated with the fifth plate and accordingly the "5 out" terminal 242 is provided. This terminal will also provide a single negative pulse for each 10 pulses to the input terminals. But it will provide this pulse after the 5th, 15th, 25th etc. pulses, while the "0 out" terminal provides its pulse after the 10th, 20th, 30th etc. pulse applied to the input terminal. The "clear" terminal 232 is normally connected to a potential above the bias supply. If the potential to which this diode is connected is decreased, the diode will conduct and all the spades are then at an equal negative potential below the cathode potential. No spades will then attract electrons and the formed beam is diffused. Thus no "count" is left in the tube.

Thus it is apparent that by energizing the appropriate "Set" input terminal the beam can be started on any one of the targets of the tube 200. It will step forward in response to pulses applied to the grids and, when it is desired, the counter may be cleared and another number set therein.

If it is desired to provide a check signal after the desired command has been completed, output circuits (not illustrated) may be provided, similar to the "0 out" and "5 out" circuits for each of the targets. The leads from these output circuits may be connected through appropriate gate circuits to the short term storage where the digital command is stored, and there compared with it to determine if the command has been properly executed.

As shown in FIG. 2*a*, counter 182, which is substantially identical to that described supplies one output pulse for every 10 pulses connected to flip-flop 180. The pulse train from counter 182 is amplified by amplifier 190 and fed to counter 188. The "0" output of counter 188 is connected via lead 198 to flip-flop 194. Thus for every 100 pulses fed to the reference counter flip-flop 194 changes state once. Since two changes of state of flip-flop 194 are required to generate a full cycle, the reference channel divides the input signal by 200. It will be noted also that the flip-flop 194 changes state on the 100th, 200th, 300th etc. pulses fed to the input terminal of the counter. This signal will be considered the reference signal against which the phase of other signals in the system are measured.

The "5" output terminal of counter 188 is connected via lead 196 to flip-flop 192. Flip-flop 192 generates an output square wave at the same frequency as flip-flop 194 but of different phase. The "5" output of counter 188 will provide an output pulse for the 50th, 150th, 250th etc. pulse fed to the reference counter. Thus flip-flop 192 will change state for the first time 50 pulse periods ahead of flip-flop 194. It will be recalled that 200 pulse periods are required for one full cycle. Hence the square wave output from flip-flop 192 leads that from flip-flop 194 by ¼ cycle or 90°. This direct derivation of the reference waveform as two separate waves in phase quadrature makes it possible to excite the two windings of a phase shifting resolver, as explained below, without any need for a separate phase splitting device.

The operation of the reference counter as explained above may be readily understood by reference to FIG. 9. As shown therein, the top line I represents the first 600 pulses from the pulse train supplied to all the counters following the start signal. Every tenth pulse of the first 100 pulses are shown, and then only every 50th pulse. The dotted lines indicate that pulses occur between each pulse illustrated.

Line II represents the output of counter 188 appearing on lead 198 "0 out." As shown, one output pulse appears for each 100 input pulses, and this output pulse appears coincidentally with the 100th, 200th, 300th etc. pulse. It will be seen that while the pulses from counter 188 are regularly spaced, they do not form a symmetrical waveform readily convertible into a sinusoidal variation for excitation of a resolver.. Line III represents one of the outputs of flip-flop 194. As shown, this flip-flop changes state once for each pulse from counter 188. Hence it generates a 400 cycle waveform as shown, one cycle of the waveform being completed following receipt of the 200th, 400th etc. pulses from the pulse source. The scale of two counter constituted by the flip-flop 194 thus not only increases the counting ratio of the channel but also converts the output of the decade counting tube into a symmetrical waveform having successive half cycles of equal duration.

Line IV of FIG. 9 represents the pulses appearing on lead 196 of counter 188. It will be observed that the first pulse appears on this lead after the 50th pulse is generated by the pulse source, and thereafter a pulse appears for every 100 pulses from the source. Thus a pulse appears for the 50th, 150th, 250th etc. source pulse. These pulses cause flip-flop 192 to change state and one of the output waveforms of this flip-flop is plotted on line V. It will be observed that the waveform of line V leads that on line III by 90° as noted above.

Figure 6:
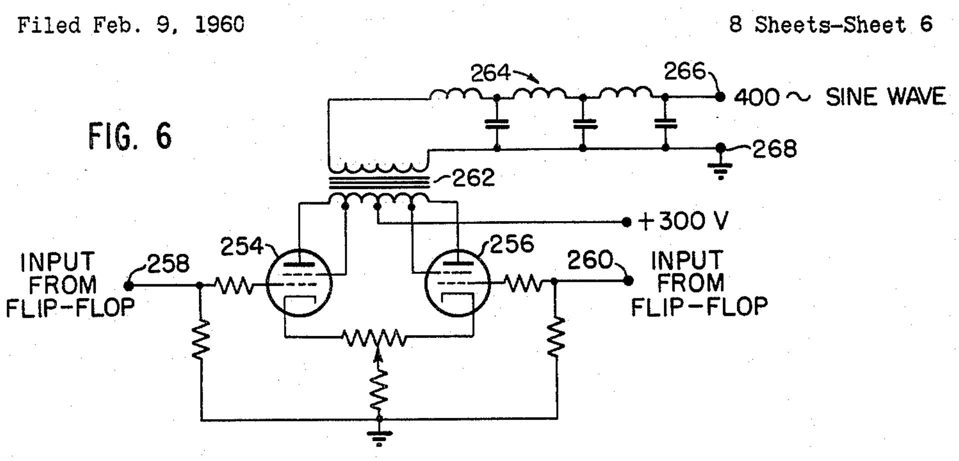
FIG. 6 is a schematic circuit diagram of a power amplifier and filter which might be used in the circuit of FIG. 2(*a*)

Both flip-flop output signals from flip-flops 192 and 194 as shown on lines III and V of FIG. 9 are connected respectively to the power amplifier and filter circuits 250 and 252. A typical schematic diagram for this circuit is illustrated in FIG. 6. As shown therein, a pair of tetrodes 254 and 256 are connected as a conventional push pull amplifier. One input signal from the driving flip-flop is connected to input terminal 258 and the other to input terminal 260. The secondary of the output transformer 262 is connected through a conventional LC filter 264 which converts the square waves supplied to the amplifier to sine waves which appear at the output terminals 266 and 268. Terminal 268 is preferably grounded as shown.

As shown in FIG. 2*a*, the output terminal 266 of circuit 250 is labeled "A" and that of circuit 252 is labeled "B." These terminals are connected to corresponding leads in the circuit of FIG. 2*b*, the letter designations being included for convenience in referring to the drawings.

The output signals from the power amplifier energize the stator windings of the two synchros 270 and 272, shown in FIG. 2*b*, the output of power amplifier 250 energizing windings 274 and 276, while the output of amplifier 252 energizes windings 278 and 280 with the reference phase.

E. *Fine axis counter*

Before describing the fine axis counter, reference will be made to FIG. 2*b*. As shown therein two synchros 270 and 272 are provided. For purposes of the present description, it will be assumed that the function of the digitally-controlled servo-mechanism is to position a movable member or shaft at one of 1000 different angular positions. To accomplish this, the coarse synchro 272 is geared to the shaft in a 1 to 1 relation i.e. the synchro 272 makes one revolution for each revolution of the controlled shaft while synchro 270 is geared in a 10 to 1 relation, i.e., it makes 10 revolutions for each shaft revolution. Thus, the coarse resolver rotor is driven with a smaller drive ratio than the fine resolver rotor, relative to the shaft or movable member. The coarse synchro 272 provides feedback information with respect to the first and second digits of the command signal, while the fine synchro provides this information for the second and third digits. Thus each of the synchros is required to transmit position information of the controlled shaft so that it may be positioned at 100 different positions.

It will be recalled that each cycle of the output square wave from the axis and reference counters occupies the time of 200 input pulses. Means may be provided for setting any number from 1 to 200 into the counter, and thus 200 different positions may be obtained. Since, for the system to be described only 100 positions are required for each axis counter, two settable counters of the type described in connection with FIG. 5 will permit setting any one of 100 positions. Additionally each counter channel includes a flip-flop to divide the signal by 2 so that the axis and reference counter output signals are at the same frequency.

As shown in FIG. 2*a* the fine axis counter includes a flip-flop 284 to which pulses from amplifier 176 are supplied. Flip-flop 284 performs the same function as flop-flop 180, supplying output signals on first one output lead and then the other to the counter 286. Counter 286 is a divide by ten settable and clearable counter, e.g. a counter such as that illustrated in FIG. 5. For every 10 pulses fed to flip-flop 284, counter 286 provides a single pulse. The output pulse train from counter 286 is connected through amplifier 288 to counter 290, counter 290 being substantially identical to counter 286. Thus counter 290 receives as an input signal one pulse for each 10 pulses from the pulse source and provides one output pulse from each 100 pulses appearing at the input terminal of flip-flop 284. The output signal from counter 290 is connected as an input signal to flip-flop 292 which divides the output signal by 2 to provide a total division by 200 in the fine axis counter.

Control signals of various types are supplied to the fine axis counter from the digital signal source. Thus before a command signal is fed to the counter 283, the flip-flop clear lead 294 is energized which sets flip-flops 284 and 292 to their zero state. Counter clear lead 296 is also energized which clears the counter and destroys any count remaining therein from the previous command.

The command signal may then be set into the counter by energization of the appropriate lead in the "units" cable 298 and the "tens" cable 300. That is, the successive decade devices 286, 290 are set to states representing the successively higher order digits of the decimal number which indicates a desired position of the movable member. Each of the units leads is connected to the appropriate input terminal of decade counter 286, and momentary energization of the lead causes that number to be set into the counter which then starts counting forward from that value. Thus if the lead labeled 4 of the "units" leads in cable 298 is energized counter 286 will provide an output pulse on the 6th, 16th, 26th, 36th etc. pulse from the pulse source. If the "6" lead in the "tens" cable is energized, then counter 290 will provide a first output pulse after 4 pulses from the counter 286 and thereafter for every ten pulses. Thus for a 64 energization of control leads to the fine axis counter, the first output pulse from counter 290 appears on the 36th pulse from the pulse source, subsequent pulses appearing on the 136th, 236th etc. pulse applied to the input. The flip-flop 292 changes state from its initial state (which is the same as the initial state of flip-flops 192 and 194) after 36 input pulses and returns to its initial state after 136 pulses, etc. It will be recalled that the reference signal from flip-flop 194 changes state after 100 input pulses and returns to its initial state after 200 pulses. Thus the output signal from flip-flop 292 leads the reference signal by a time equal to 64 pulse periods, the same number as that set into the counters 286 and 290.

The foregoing example of fine axis counter operation is illustrated on lines VI, VII and VIII of FIGURE 9. Thus line VI represents the pulse output signals from units counter 286 when a "4" has been set therein. The first output pulse appears concurrently with the 6th pulse from the source, the second with the 16th etc. All pulses produced for the first 10 are shown. Thereafter, only the 5th and 10th are illustrated, the dotted lines indicating that pulses also occur between the illustrated pulses.

Line VII represents the output of the counter 290 when it is supplied by the pulses of line VI and a "6" has been set into the counter. The first output pulse appears after four input pulses are received. Thus, the pulse corresponding to the 36th source pulse will generate an output pulse from counter 290 and thereafter an output pulse will appear for each 100 input pulses as shown.

These pulses, supplied to flip-flop 292 cause it to generate the 400 cycle square wave illustrated on line VIII. The flip-flop 292 thus converts the spaced pulses forming the output of decade counter 290 into a symmetrical waveform. It will be observed that this square wave leads the reference square wave of line III by 64 pulse periods, the commanded amount.

If it were desired to set the full 200 possible positions into the counter, provision would have to be made to set flip-flop 290 to one of its two different states depending upon whether the desired position was in the first or second hundred positions available. Since, in the present example only 100 positions are required, flip-flop 292 is set to the same position as flip-flop 194 at the beginning of each command.

The square wave signal of controlled phase appearing at the output terminal of flip-flop 292 is applied to the discriminator 302 through buffer amplifier 304. Also connected to the input terminals of discriminator 302 is the secondary of transformer 306 (FIG. 2*b*) whose primary winding is supplied by one rotor winding 308 of the synchro 270. The other rotor winding 310 is connected across resistor 312. As explained in connection with FIG. 1, the phase of the signal applied to the transformer 306 and therefore of the signal supplied to discriminator 302 with respect to the reference signal, will be directly related to the angular position of the shaft of synchro 270 with respect to a reference position. It will also be of substantially constant magnitude.

Thus a signal whose phase with respect to the reference signal, is representative of the desired position of the fine axis synchro is connected to discriminator 302 through amplifier 304. A signal whose phase is representative of the actual position of the fine axis synchro appears on the leads labeled "C" and "D." The discriminator output signal, appearing on the leads labeled "E" "F" is fed to the fine axis servo amplifier 314 (FIG. 2*b*) as an error signal to drive the servomechanism to a position where both signals are identical.

Figures 7, 8A, 8B:
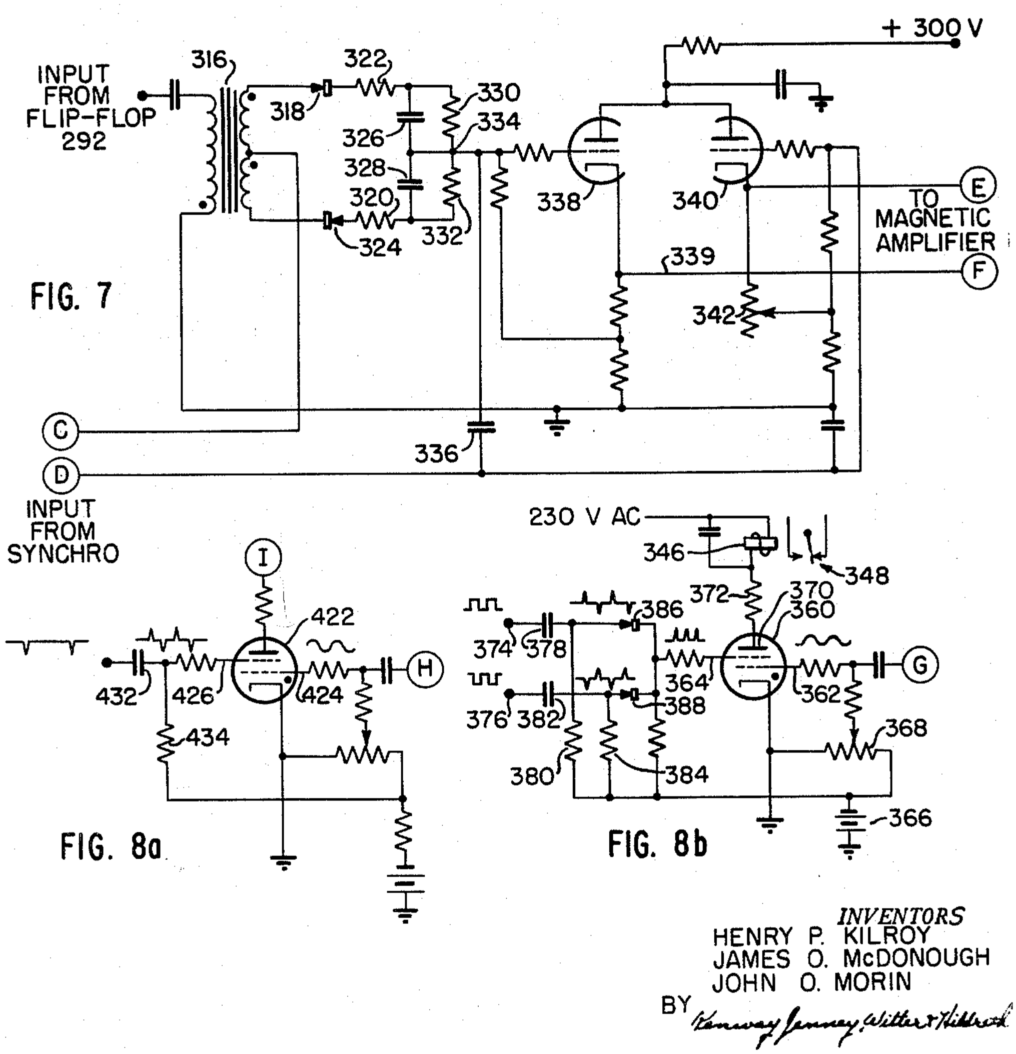
FIG. 7 is a schematic circuit diagram of a discriminator such as might be used in connection with the circuit of FIG. 2(*a*)

A typical circuit which might be used for the discriminator 302 of Fig 2*a* is shown in FIG. 7. As shown, the input signal from flip-flop 292 is applied through buffer amplifier 304 to the primary of pulse transformer 316, whose center-tapped secondary is connected through diodes 318 and 320 and resistors 322 and 324 in series to the filter networks including capacitors 326 and 328 and resistors 330 and 332. The synchro input appearing on terminals C and D is connected between the center tap of the transformer and one side of capacitor 336. The other side of the capacitor is connected to the junction 334 of resistors 330 and 332. Buffer amplifier 304, which is similar to amplifier 102 described in connection with the pulse source differentiates and amplifies the flip-flop signal to provide a sampling pulse once every cycle of flip-flop operation. The sampling pulse is generated by the change in state of the flip-flop occurring at the end of the flip-flop cycle. This samplying pulse is connected through transformer 316 to periodically "sample" the sine wave signal applied between the center tap of the transformer and capacitor 336.

In the absence of any synchro signal or with a zero signal applied across terminals C and D, the diodes 318 and 320 will each be biased off except during the sampling time. Since the circuit is symmetrical equal currents will flow through them and the potentials appearing at opposite ends of the resistors 330 and 332 will be equal, opposite with respect to ground and substantially constant. The capacitors 326 and 328 will charge to a potential such that loss by leakage is just balanced by the current flowing during sampling, so that the lowest voltage to which the capacitors discharge will be greater than the peak of the sine wave appearing at C and D.

If it is now assumed that the sine wave from the synchro is present at the time of sampling, and if it is further assumed to be in the positive half cycle, operation of the diodes by the sampling pulse will cause current to flow through diode 318 and resistors 322 and 330 to charge condenser 336 to the value of the potential appearing at the transformer center tap. When the diodes 318 and 320 are biased off by the removal of the sampling pulse, the condenser 336 retains its charge, applying the sampled voltage to the grid circuits of triodes 338 and 340. As the voltage across the terminals C and D changes, the voltage appearing across capacitor 336 (and therefore applied to the grids of tube 338 and 340) will follow these changes. Since, as will be explained below, the servomechanism magnetic amplifier will receive a control signal at all times except when 0 voltage is present at the grids of the tubes 338 and 340, the servomechanism will drive until the sine wave supplied by the synchro 270 is providing a zero signal at the time sampling occurs. This condition only occurs when the sampling pulse occurs at the zero crossing of the sine wave, i.e when the square wave generating the sampling pulse and the sine wave are in phase.

While it is theoretically possible for the square wave and sine wave to "lock" when they are 180° out of phase, this is not possible in the system here described. It will be recalled that the course axis system positions the controlled member in accordance with the first two digits of the command signal. Thus if the command is 364, then the course axis positions the controlled member to 36X and the fine system to X64. The reason for this is now apparent. The complementary or 180° position in which "locking" would be possible would be represented by the command 14. However, since the coarse axis system has already roughly positioned the controlled member in the vicinity of the position represented by the fine command 64, the servomechanism will drive the load to the desired position rather than to the undesired one. To have the system lock at the complementary position, the course servo would have to leave the controlled member exactly at the position 314. This would be an error of greater than 4 units in the final digit of the coarse positioning system and such an occurrence could only result from malfunction of the equipment.

The varying direct voltage from the discriminator appearing at terminal 334 of FIG. 7 is applied to the grid circuits of triodes 338 and 340 which are connected as a cathode follower in a differential amplifier. The cathode of tridoe 338 is connected via lead 339 and terminal F to one side of the control winding of the magnetic amplifier 314. The other side of the control winding is connected via terminal E to the cathode of triode 340. Triode 340 is also connected as a cathode follower having an adjustable direct cathode voltage for balance. By adjusting variable resistor 342, the potential at cathode of triode 340 may be made identical to that at the cathode of triode 338 when the signals applied to the discriminator are exactly in phase. Thereafter the magnitude and direction of current flow through the control winding of magnetic amplifier will follow the direct voltage applied to the grids of triodes 338 and 340. If the cathode voltage of triode 338 is greater than that of triode 340, current flows from terminal F through the control winding to terminal E. If the voltage at the cathode of triode 338 is below that at the cathode of triode 340, current flow is in the opposite direction.

It will be observed in FIG. 2*a* that both the output signals from flip-flop 292 are connected to the switch circuit 344 which together with relay 346 generates a "STOP" signal to cut off the pulse train to the decoder. This novel switch circuit, as will be described below, maintains relay 346 in the operated condition while a phase difference exists between the signal connected thereto from the synchro on lead G and the flip-flop signals. When this phase difference is substantially 0, relay 346 is released, and through the normally closed contacts 348 battery 350 is connected to gate 352 via lead 354. The voltage on lead 354 opens the gate and stops the decoder operation as will be hereinafter explained.

The switch circuit 344 is illustrated in FIG. 8*b*. As shown therein, the circuit utilizes a gas tube, 360 having a pair of grids 362 and 364. As shown, grid 362 is connected to an adjustable source of bias potential supplied by battery 366 and potentiometer 368. The synchro voltage whose phase represents the postiion of synchro 270 is supplied to grid 362 via terminal G. As shown in FIG. 2*b* this voltage is also derived from a secondary winding of transformer 306, the same transformer which supplies the synchro voltage to the discriminator.

The plate 370 of gas tube 360 is connected through resistor 372 and the coil of relay 346 to a source of alternating potential, here indicated as being 230 volts and having a frequnecy, for example of 60 cycles. The two flip-flop output signals are connected to terminals 374 and 376. A differentiating circuit is connected to each of these input terminals, that connected to terminal 374 including capacitor 378 and resistor 380, while that connected to terminal 376 includes capacitor 382 and resistor 384.

The positive and negative pulses developed from the flip-flop signals are applied to the diodes 386 and 388, which are so connected that they pass only positive pulses. The positive pulses passed by the diodes are summed and supplied to the grid 364. Since the pulses were derived from a pair of 400 cycle flip-flop signals which were 180° out of phase, the pulses supplied to grid 364 will be at an 800 cycle rate and each pulse will occur at substantially the same time as the flip-flop signal changes state.

The bias on grid 362 is adjusted so that the gas tube 360 will fire if a positive pulse appears on grid 364 at a time when the synchro voltage on grid 362 is in its positive half cycle. If a pulse is applied to grid 364 at the zero crossing, or during the negative half-cycle of the synchro signal, the tube will not fire. Thus if the synchro voltage is not in phase with the flip-flop signals supplying the pulses, at least one pulse will occur during each positive half-cycle of synchro voltage and the tube will fire at least once each cycle. The tube thus will fire at a 400 cycle rate, drawing pulses of current through the coil of relay 346, and holding the relay in the operated condition. If however, the synchro shaft is positioned so that the zero-crossings of the synchro signal coincide with the application of pulses to the grid 364, the tube 360 will not fire and relay 346 will be released. Since pulses applied to grid 364 coincide with the zero-crossings of the flip-flop signals, the flip-flop and synchro signals will be in phase when relay 346 drops out. As was explained in the case of the discriminator, there is a possibility of a 180° ambiguity i.e. relay 346 might drop out if the synchro signal is 180° out of phase with the fine axis flip-flop signal. However, as explained in connection with the discriminator, the coarse position channel prevents the system from seeking the wrong position. With the circuit of FIG. 8*b* the relay drop-out is sharply defined and can occur only when the two signals are either exactly in phase (or 180° out of phase). By using alternating voltage of a relatively low frequency on the plate of tube 360, the tube is extinguished each half cycle of the plate supply. Thus, if the 400 cycle synchro signal is in phase with the pulses on grid 364, the tube once extinguished, will not reignite and relay 346 will drop out. If, when the plate supply goes positive again, they are not in phase the tube will reignite and hold the relay operated. The capacitor in parallel with the relay coil is sufficiently large to hold the relay in its operated condition for a time slightly longer than the negative half cycle of the plate supply voltage.

The diagram of FIG. 10 indicates the relative time relationships of the signals applied to the switch circuit. Thus line I illustrates one full cycle of the 60 cycle supply voltage. Tube 360 can be turned on only during the first half cycle of the 60 cycle signal. It will be extinguished, as explained above during the last half cycle.

For purposes of illustration a 400 cycle signal having the same phase as the 400 cycle reference signal is chosen. The phase of the 400 cycle signal will vary continuously with respect to the 60 cycle supply since the ratio of the two frequencies is not an integer. The pulses supplied to grid 364 will be identical in time with those appearing on line VII of FIG. 9 for a "64" command and hence this line is repeated in FIG. 10 for purposes of illustration.

As shown the first pulse "36" on line VII appears when the 400 cycle sine wave is negative and has no effect. However the second pulse "136" occurs a half period later during a positive half cycle of the 400 cycle sine wave and since the plate 370 and grid 362 of tube 360 are both positive, the tube fires, causing relay 346 to operate. The tube continues in this condition until the end of the positive half cycle of the 60 cycle signal when it is extinguished. However relay 346 holds in because of the condenser in parallel with it. During the next positive half cycle of the 60 cycle sine wave the tube 360 will fire again, unless during the interim, the controlled member has been repositioned so that the 400 cycle signal phase is such that its zero crossings occur at the same time as the pulses on grid 364. This corresponds to the condition of a phase match between the 400 cycle signal and the square waves generated by flip-flop 292. Thus, relay 346 will remain operated until a phase match is obtained between the 400 cycle signal appearing on grid 362 and the square waves supplying pulses to grid 364.

F. *Coarse axis counter*

The coarse axis counter or divider channel, illustrated in FIG. 2*a* includes a pair of settable, clearable counters 400 and 402 similar to the counters 286 and 290 of the fine axis counter. These counters each divide the input pulse train by 10. In contrast to the fine axis counter, however, the divide by 2 flip-flop 404 is positioned at the beginning rather than at the end of the counting chain. Thus every second pulse from the pulse source is fed to the buffer flip-flop 406 which drives the odd and even grids to counter 400. Counter 400 supplies a pulse, via amplifier 408 to counter 402 for every 20th input pulse; and counter 402 supplies an output pulse for every 200 input pulses. It will be observed that flip-flops 404 and 406 are connected to the "Flip-Flop Clear" lead 294 and the appropriate terminals of counters 400 and 402 are connected to the "Counter Clear" input lead from the digital source. The leads of the "tens" cable 300 from the digital source are connected to the "Set" terminals of counter 400 and the leads of the "hundreds" cable 410 are connected to the appropriate terminals of counter 402.

If the digital command 36X is set into the decoder (where X represents any number and is set into the fine axis counter), the counter 402 after clearing will be set to "3" and the counter 400 to "6." In other words, the successive decade devices in the fine axis counter are set to represent the successively higher order digits of a first group of digits (units and tens) of the decimal number, while the successive decade devices in the coarse counter are set to represent successively higher order digits of a second group (tens and hundreds) of the decimal number. Counter 400 will produce a first output pulse after 8 input pulses are supplied by the pulse generator. Thereafter it will produce an output pulse after the 28th, 48th, 68th, 88th, etc. pulses. These pulses are fed to counter 402 which begins counting at "3." Accordingly it will produce an output pulse after 7 input pulses to counter 402 or on the 128th pulse appearing at the input of flip-flop 404. Thereafter, pulses will appear at the "0 OUT" terminal of counter 402 after 328, 528, 728 etc. pulses appearing at the input terminal of the coarse axis counter. Thus, the output signal from the coarse axis counter is not a square wave, but is merely a pulse occurring at a 400 cycle rate. The pulse signifies the beginning (or the end) of one cycle of the coarse axis counter. In the example given, the first output pulse occurs 72 pulses ahead of the completion of the first cycle of the reference counter. Since 200 pulse periods are used to represent 100 possible positions, this means that the pulses from the counter 402 are leading the reference counter output by 36 units of phase, which is the command which was to be produced. The "0 OUT" terminal of counter 402 is connected by lead 414 to switch circuit 416. The "5 OUT" terminal is connected by lead 418 to switch circuit 420. Since counter 402 advances one count for each 20 pulses from the pulse source, the output pulses appearing on lead 418 are separated in time by 100 pulse periods from those on lead 414. This corresponds to a phase difference of 180° where 200 pulse periods correspond to the time of one full cycle.

Lines IX, X and XI of FIG. 9 illustrate the operation of the coarse axis counter. Thus the output pulses from counter 400 are shown on line 9. Since a "6" is set into the counter, an output pulse will appear thereon after the 4th pulse is fed to the counter. Because of flip-flop 404, this will be the 8th pulse from the pulse source. Thereafter a pulse will appear at the output of counter 400 for every 20 pulses from the pulse source i.e. on the 28th, 48th, 68th, 88th, 128th etc. pulses. These are illustrated on line IX. Subsequently only every 5th pulse is illustrated, the dotted lines indicating the intervening pulses. Line X illustrates the "0" output from counter 402. With a "3" set into this counter, the first output pulse will appear after the 7th pulse on line IX i.e. after the pulse corresponding to the 128th pulse from the pulse source. Thereafter an output pulse appears after each 200 pulses i.e. on the 328th, 528th, 728th etc. pulses.

Lines XI illustrate the pulses appearing on the "5 OUT" terminal of counter 402. The first pulse appears after 2 input pulses, i.e. on the 28th pulse from the source, and thereafter on every 200th source pulses. The pulses on the "OUT" and "5 OUT" terminals of counter 402 are used to operate the switch circuits 416 and 420 causing the coarse drive motor to drive in one or the other direction as required, to generally position the load in accordance with the command signal.

The switch circuits 416 and 420 are substantially identical and are illustrated in FIG. 8*a*. The circuit, except for the grid input circuit is similar to that illustrated in FIG. 8*b*. Thus a gas tube 422 having grids 424 and 426 is provided. The circuit associated with grid 424 is the same as that associated with grid 362 of FIG. 8*b* and will not be described in detail. A synchro signal whose phase is representative of the position of coarse synchro 272 is supplied to the circuit of grid 424 via terminal M from the secondary of transformer 428 (FIG. 2*b*). The primary of transformer 428 is connected to one of the two rotor windings of synchro 272, the other rotor winding of the synchro being connected across a resistor 430, in the same manner as synchro 270. Thus the secondary of transformer 428 supplies a voltage to the switch circuit of FIG. 8*a* whose phase with respect to the reference potential is a measure of the synchro shaft position.

The plates of each tube in the switch circuits of FIG. 2*a* are connected via either terminal I or J to the coils of relays 428 and 430 (FIG. 2*b*), the other ends of the coils being connected to a source of 230 volts, 60 cycle alternating voltage. These relays form a part of the coarse motor control circuit. The circuit associated with the grid 426 in FIG. 8*a* has provision for only a single input circuit and the pulse output signals from, for example, the "5 OUT" terminal of the counter 402 are connected to the input terminal of this circuit. A differentiating circuit formed by capacitor 432 and resistor 434 sharpens pulses applied thereto and applies them to the grid 426 of gas tube 422. Again the bias of the tube is set so that the tube will fire if positive half cycles of synchro voltage are present on the grid 424 at the same time that positive pulses are present on grid 426 and the plate supply voltage is in its positive half cycle.

It will be recalled that one pulse per cycle is applied to grid 426 of the switch circuits 416 and 420 of FIG. 2*a*, the pulses applied to switch circuit 416 occurring at the beginning (or the end) of each cycle, and those applied to circuit 420 occurring at the mid-point of each cycle. If the synchro signal is out of phase with these pulses, either relay 428 or 430 of FIG. 2*b* will remain operated. If relay 430 is operated it causes power to be applied to coarse drive motor 438 through the front contacts of the transfer pair generally indicated at 440 and through the back contacts of the transfer pair generally indicated at 442. Application of power in this direction will be considered "positive." The coarse drive motor will reposition the controlled member and the shaft of synchro 272 until the positive pulses supplied to the switch circuit 416 occur in time at one of the zero crossings of the synchro signal. When this occurs the operated relay will drop out and power is removed from the coarse drive motor. If, when the command signal is initially generated, the pulse appearing on lead 414 is occurring during a negative half cycle of the 400 cycle synchro voltage, then the tube associated with switch circuit 416 will not fire. However, under this condition, the pulses supplied on lead 418 to circuit 420 will occur during positive half cycles of the synchro voltage, causing relay 428 to become operated. Operation of this relay supplies power to motor 438, but the phase is reversed, thus causing the coarse drive motor to drive the load in a direction opposite to the direction of drive when relay 430 is operated. Phase reversal of the coarse drive motor supply is accomplished by reversing the input leads on the front contacts of the transfers indicated at 442 and operated by relay 428. Again, the drive motor will drive until the pulses applied to the circuit 420 occur at the zero crossings of the synchro voltage.

It is possible for the relays 428 and 430 to be locked when the synchro voltage is in phase or 180° out of phase with the pulses supplied by counter 402. Possible positioning error may be avoided by programming the digital commands to the decoder so that large changes in position which might permit positioning on the undesired null, are made in two steps.

The operation of the switch circuit of FIG. 8*a* may be better understood by referring to FIG. 10. The lines X and XI in this figure correspond to the lines X and XI of FIG. 9. The reader will recall that the 400 cycle signal illustrated in FIG. 10 has the same phase as the 400 cycle reference signal and represents the output signal from a synchro resolver when the controlled member is in the 0 position. If, when the controlled member is in the 0 position, a command signal "36X" is fed to the coarse channel the pulse train of line X will be applied to switch 416 and that on line XI to switch 420. Under these conditions it will be observed that the pulses applied to switch 420 always occur during negative half cycles of the synchro signal and relay 428 (FIG. 2*b*) remains released. However, the pulses of line X occur during positive half cycles of the 400 cycle synchro signal, and hence will cause relay 430 to operate, supplying power to the coarse drive motor 438. The motor 438 will drive until the load and the shaft of the coarse synchro 272 are so positioned that a zero crossing of the 400 cycle signal on terminal M occurs at the same time as one of the pulses on line X. Relay 430 will then drop out. The pulses on line XI, which are spaced exactly ½ of the 400 cycle period from those on line X, will then also be occurring at a zero crossing. Hence relay 428 will not be operated and power will be removed from the coarse drive motor. Thus by using a pair of switch circuits such as are illustrated in FIG. 8*a* the controlled member may be approximately positioned without the use of conventional servo amplifiers and associated equipment.

In addition to the coarse motor control, the relays 428 and 430 (FIG. 2*b*) also control the power supplied to the clutch 444 between the fine axis drive motor and the load. Thus power is supplied to the clutch, only when both relays are released. Hence operation of the fine axis servomechanism is prevented until both relays 428 and 430 drop out signifying that coarse positioning has been completed. Power is then applied to the clutch 444 to permit the fine axis servomechanism to position the controlled member in accordance with the fine axis command.

G. *Operation*

It is believed that the operation of our improved decoder and the associated servomechanism will be apparent from the preceding description. However a brief description of a complete cycle of operation is here provided by way of a summary. For this description reference is made to FIGS. 2*a* and 2*b*.

Following completion of the previous command signal, as indicated by the presence of a stop signal on lead 354, the digital command source energizes the flip-flop and counter clear leads 294 and 296, thus clearing the coarse and fine axis counter. The set reference terminal 174 is energized to set the reference channel counters 182 and 188 and associated flip-flops to the zero state. An appropriate digital command is then supplied to the counters, the hundreds digit to counter 402, the tens digit to counters 400 of the coarse axis counter and 290 of the fine axis counter and the units digit to counter 286.

With the reference, fine and coarse axis counters all set to their proper initial conditions, the digital command source supplies a start signal to gate 128. The next pulse from amplifier 102 is passed by the gate 128 and operates flip-flop 132. Operation of flip-flop 132 opens gate 172 and supplies pulses through amplifier 176 to the three counters. The reference counter generates a 400 square wave which is amplified and filtered and applied to the stators of the feedback synchros 270 and 272. A signal representing the position of coarse synchro 272 is connected to the switch circuits 416 and 420. To these circuits are also supplied pulses from the coarse axis counter, the phase of these pulses with respect to the reference being determined by the command signal set into counters 400 and 402. Unless the pulses supplied by counter 402 are occurring in phase (or 180° out of phase) with the signal from coarse axis synchro 272, one of the two relays 428 or 430 will operate. Which of these relays operates depends on the relative phase of the synchro rotor voltage. If relay 430 operates, power is supplied to motor 438 to drive it in a first direction to bring the controlled member and the shaft of synchro 272 to a position where the synchro voltage is in phase with the pulses; if relay 428 operates, rather than relay 430, the motor drives in the opposite direction. When the shaft of synchro 272 arrives at a position such that the phase of the synchro voltage is approximately 0 with respect to the pulses supplied from the coarse axis counter, the operated relay drops out.

Power is then supplied through the back contacts of both relays 428 and 430 to the clutch 444 to permit the servomotor associated with the fine axis servomechanism to accurately position the controlled member. The discriminator 302 compares the phase of the square wave signal generated by the fine axis counter with the phase of the signal representative of the controlled member position generated by fine axis synchro 270. A signal whose magnitude and direction is proportional to the phase difference of these two signals is generated by the discriminator and connected to the magnetic amplifier 314 which controls power to the fine axis drive motor. Responding to the discriminator signal, the fine axis drive motor positions the controlled member to minimize the discriminator output signal.

When the fine axis signal and the synchro feedback signal are exactly in phase, relay 346 which had been operated by switch circuit 344 drops out, energizing lead 354 and opening gate 352. The next following change of state of the output flip-flop 194 in the reference counter to the "0" condition is passed through gate 352 to the input terminal of flip-flop 132, causing it to revert to its original state. Just as causing flip-flop 132 to change state at the beginning of the cycle resulted in pulses flowing to the counter circuits, operation a second time at the end of the cycle causes the gate 172 to close and cuts off the flow of pulses to the counter channels.

The digital source, responding to the stop signal, may now set a new command into the decoder.

It will thus be seen that we have provided an improved digital to analog decoder in which the analog information appears as the relative phase between a periodically varying reference signal and one or more periodically varying command signals. In particular we have illustrated our improved decoder in a two channel embodiment for controlling the rotary position of a controlled member in conjunction with a servomechanism. While we have illustrated only a coarse and fine channel, it will be apparent that multiple control channels of varying degrees of sensitivity may be provided, and that a number of axes may be controlled.

The decoder of our invention is particularly useful in positioning a controlled member in the shortest possible time at a number of discrete positions, the path by which these positions are reached being unrelated to the desired result. Our decoder may also be used to provide discrete velocities or accelerations through the use of transducers capable of measuring the controlled quantity and providing a periodically varying signal whose phase is a measure of the actual value of the controlled quantity.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

While the invention has been shown and described in detail with reference to a preferred embodiment, there is no intention that it be limited to such detail. On the contrary it is intended here to cover all modifications, alterations, and equivalents which fall within the spirit and scope of the invention as defined by the appended claims.

Having described our invention, what we claim as new and desire to secure by Letters Patent is:

1. A digitally controlled position servomechanism comprising, in combination, a pulse source, at least three counters, each of said counters providing a periodic output signal at integrally related frequencies which are a submultiple of the frequency of pulses supplied thereto, means connecting the pulses from said pulse source to the input terminals of said counters, a first of said counters providing a waveform of reference phase, a second of said counters providing a coarse waveform, and a third of said counters providing a fine waveform, means for interrupting the pulses from said pulse source to said second and third counters, means for setting a count into said second and third counters when said pulse interrupting means is operated, the more significant digit of a digital command signal being set into said second counter and the less significant digits being set into said third counter, means for starting pulse flow to said second and third counters at a time corresponding to a predetermined point on said reference waveform, said digital command signal thereby being represented by the phase difference of said coarse and fine waveforms from said reference waveform, a controlled member, means mechanically connecting the shaft of a first synchro resolver to said controlled member, means mechanically connecting the shaft of a second synchro resolver to said controlled member, said first syncro resolver being connected for coarse measurement of said controlled member position, and said second synchro resolver being connected for fine measurement of said controlled member position, means connecting said reference waveform to excite said resolvers, said resolvers providing an output signal whose phase is a measure of the controlled member position, a first relative phase measuring means, means connecting the first resolver output signal to said first phase measuring means, means connecting said coarse waveform to said first phase measuring means, and first means responsive to the output signal from said first phase measuring means for positioning said controlled member to minimize the phase difference between said coarse waveform and said first resolver output signal, a second phase measuring means, means connecting said second resolver output signal as one input signal to said second phase measuring means, means connecting said fine waveform as another input signal to said second phase measuring means, and second means for positioning said controlled member to minimize the phase difference between said fine waveform and said second resolver output signal.

2. The combination defined in claim 1 in which said pulse interrupting means simultaneously interrupts pulses to said first counter when it interrupts pulses to said second and third counters.

3. The combination defined in claim 1 which includes means for switching position control of said controlled member from said first positioning means to said second positioning means when the phase difference between said coarse waveform and said first resolver output signal is a minimum.

4. The combination defined in claim 1 which includes means for operating said pulse interrupting means, said operating means including a gate circuit adapted to pass an operating signal to said pulse interrupting means when the phase difference between said fine waveform and said second resolver output signal is a minimum, and said reference waveform is at the end of one full cycle.

5. A digitally controlled servomechanism for positioning a movable member comprising, in combination, a first counter including a plurality of decade counting devices connected in tandem to provide a predetermined counting ratio, a reference counter having the same counting ratio as said first counter, a source of recurring signals and means for supplying the same to said first and reference counters so that the latter respectively produce first and reference periodic waveforms which are the identical submultiple in frequency of the frequency of source signals, a source of command signals representing in digital form the successive digits of a decimal number which designates a desired position of the movable member, means for stopping said first and reference counters, means responsive to said command signals for setting the successive decade counting devices in said first counter to states representative of the values of successively higher order digits of said decimal number, means for setting said reference counter to zero count, means for restarting said counters so that the two waveforms produced thereby are displaced in phase by an amount representative of said decimal number; a phase shifting resolver having a stator, rotor, input winding and output winding; means connecting said resolver rotor to be turned in proportion to movement of the movable member, means responsive to said reference waveform for exciting said input winding, means for receiving and comparing the phase of said first waveform and the output signal from said resolver output winding, and means responsive to said phase comparing means for translating the movable member until said first waveform and said output signal are in phase agreement.

6. A digitally controlled servomechanism for positioning a movable member comprising, in combination, a coarse counter and a fine counter each including a plurality decade counting devices connected in tandem to provide a predetermined counting ratio; a reference counter having the same counting ratio as said coarse and fine counters; a source of recurring signals and means for supplying the same to said coarse, fine, and reference counters so that the latter respectively produce coarse, fine and reference waveforms of identical submultiples of the frequency of the recurring signals; a source of command signals representing in digital form the successive digits of a decimal number which designates a desired position of the movable member; means for stopping all of said counters; means responsive to said command signals for setting the successive decade counting devices of said coarse counter to states representative of the values of a first group of successively higher order digits of said decimal number and for setting the successive decade counting devices of said fine counter to states representative of the values of a second group of successively higher order digits of said decimal number; said first group including higher order digits than said second group; means for setting said reference counter to zero count; means for restarting all of said counters after such setting thereof; coarse and fine phase shifting resolvers each having a stator, rotor, input winding, and output winding; means mechanically connecting said coarse and fine rotors to be turned with respectively smaller and greater ratios in proportion to movement of the movable member; means responsive to said reference waveform for exciting the input windings of said coarse and fine resolvers, a first phase comparator connected to receive the said coarse waveform and the output winding signal from said coarse resolver; a second phase comparator connected to receive said fine waveform and the output winding signal from said fine resolver; means responsive to said first comparator for translating said movable member until it approaches to within a predetermined distance of the desired position; and means responsive to said second comparator for translating said movable member until it reaches said desired position.

7. A digitally controlled servomechanism for positioning a movable member comprising, in combination, a first waveform generator for producing a first periodic waveform, a reference waveform generator for producing a reference periodic waveform of the same frequency as said first waveform, a source of command signals representing in digital form the numerical value of a desired position of the movable member, means responsive to said command signals for setting said first generator and starting the same so that the first waveform is displaced in phase relative to the reference waveform by an angle representative of the digitally represented numerical value, a phase shifting feedback device having input and output terminals and a movable element mechanically connected to the movable member, means for supplying said reference waveform to said input terminals to excite said device, a phase comparator connected to receive said first waveform and the signal from the output terminals of said feedback device, means controlled by said comparator for translating the movable member until it reaches said desired position, means for signalling when the output signal from said feedback device and said first waveform are in phase agreement, and means responsive to said last named means for stopping said generators at a predetermined instant along said reference waveform.

8. A digitally controlled servomechanism for positioning a movable member comprising, in combination a first counter, a reference counter having the same counting ratio as said first counter, a source of recurring pulses, closable gate means for supplying said recurring pulses to the inputs of said counters, a source of command signals representing digitally the value of a number designating a desired position of said movable member, means responsive to said command signals for presetting said first counter to a count representing said number, means for opening said gate means after operation of said presetting means so that said first and reference counters respectively produce first and reference periodic waveforms of identical frequency but displaced in phase by an angle proportional to said number, a phase shifting feedback device connected to be excited by said reference waveform and having means for producing an output waveform displaced in phase relative to said reference waveform by an angle proportional to the actual position of the movable element, a phase comparator connected to receive said first waveform and the output waveform from said feedback device, means responsive to said comparator for translating said movable element until the two inputs to said comparator agree in phase, and means for closing said gate means at the instant that both (*a*) the inputs to said comparator reach phase agreement and (*b*) said reference counter reaches zero count, whereby the first and reference counters are stopped in states identical to those they had when the gate means were opened.

9. A digitally controlled servomechanism for positioning a movable member comprising, in combination, first and reference counting channels each including a plurality decade scaling electron discharge tubes connected in tandem with each such tube having ten targets respectively representing the decimal digits 0 through 9, a source of recurring pulses, normally closed gate means for supplying said recurring pulses to said counting channels, a source of command signals representing digitally the values of successive digits of a decimal number indicating a desired position of said movable element, means for setting the tubes in said reference channel for conduction by the "0" targets therein, means responsive to said command signals for setting the successive tubes in said first channel for conduction by the targets corresponding to the values of successively higher order digits of said decimal number, means for opening said gate means so that said first and reference counting channels begin producing first and reference waveforms of the same frequency but displaced in phase by an angle proportional to said decimal number, a phase shifting feedback device connected to be excited by said reference waveform and including means for producing a feedback waveform shifted in phase according to the actual position occupied by the movable member, a phase comparator connected to receive said first and feedback waveforms, and means responsive to said comparator for translating the movable member until the first and feedback waveform are brought into phase agreement.

10. The combination set forth in claim 9, further characterized in that said first and reference scaling channels include scale-of-two counting devices at the ends thereof, so that the first and reference waveforms have symmetrical half cycles.

11. The combination set forth in claim 9, further characterized by two scale of two counting devices respectively connected to the "0" and "5" targets in the last decade tube of the reference counting channel, whereby the reference counting channel produces two symmetrical waveforms constantly displaced by 90° in phase, and characterized in that said feedback device is a synchro resolver excited by two sine waves derived from said symmetrical waveforms and also separated 90° in phase.

12. A digitally controlled servomechanism comprising, in combination, a recurring pulse source, first and second counters respectively providing first and second periodic waveforms of similar shape at a sub-multiple of the frequency of input pulses supplied thereto, interruptable means for transmitting the pulses from said source to the inputs of said counters, means for setting said second counter to a count corresponding to a digital command while the transmission of pulses is interrupted by said interruptable means, a controlled device, a phase shifting feedback device coupled to said controlled device for measuring a physical quality of the latter, means for exciting said phase shifting feedback device from said first waveform to cause the latter to produce a feedback signal of the same frequency as said first waveform but shifted in phase relative thereto according to the measured physical quality, a phase comparator connected to receive as inputs said second waveform and said feedback signal, means responsive to the output of said comparator for controlling said measured quality of said controlled device to reduce such output substantially to zero, a switch circuit having at least two input terminals, a bi-state device connected to said switch circuit and controlled thereby, means connecting said second waveform and said feedback signal to respectively different input terminals of said switch device, said switch circuit including means for setting said bi-state device to one state or the other state when the second waveform and feedback signal are respectively mis-matched or matched in phase, a normally closed gate circuit, means responsive to said bi-state device being in said other state for opening said gate circuit, means for supplying an input pulse to said gate circuit at the end of each cycle of said first waveform, and means responsive to a pulse passed by said gate circuit for actuating said interruptable means to interrupt transmission of pulses therethrough.

13. Digital control apparatus comprising, in combination, a first waveform generator for producing a first periodic waveform, a reference waveform generator for producing a reference periodic waveform of the same frequency as said first waveform, a source of command signals representing in digital form a numerical value of a controlled variable, means responsive to said command signals for setting said first generator and starting the same so that the first waveform is displaced in phase relative to the reference waveform by an angle representative of the digitally represented numerical value, means responsive to said first and reference waveforms for changing the controlled variable until it agrees with the said numerical value, means for signalling when such agreement is reached, and means responsive to said signalling means and to said reference generator for stopping said generators at a predetermined instant along said reference waveform when said first generator, in the absence of malfunction, is in a state corresponding to that to which it was initially set by said setting means.

14. Digital control apparatus comprising, in combination, a first counter including a plurality of decade counting devices connected in tandem to provide a predetermined counting ratio, a reference counter having the same counting ratio as said first counter, a source of recurring signals and means for applying the same to said first and reference counters so that the latter respectively produce first and reference periodic waveforms which are the identical submultiple of the frequency of said recurring source signals, a source of command signals representing in digital form the successive digits of a decimal number, means for stopping said first and reference counters, means responsive to said command signals for setting said successive decade counting devices in said first counter to states representative of the values of successively higher order digits of said decimal number, means for setting said reference counter to zero count, and means for restarting said counters so that the two waveforms produced thereby are displaced in phase by an amount representative of said decimal number.

15. Apparatus for controlling a variable according to digital information comprising, in combination, a coarse counter and a fine counter each including a plurality of counting devices connected in tandem to provide a predetermined counting ratio; a reference counter having the same counting ratio as said coarse and fine counters; a source of recurring signals and means for supplying the same to said coarse, fine and reference counters so that the latter respectively produce coarse, fine and reference waveforms of an identical submultiple of the frequency of the recurring signals; a source of command signals representing in digital form a multi-digit number; means for stopping all of said counters; means responsive to said command signals for setting the coarse counter to a count state representative of a higher order group of digits of said number, and for setting said fine counter to a count state representative of a lower order group of digits of said number; means for setting said reference counter to zero count; means for restarting all of said counters after such setting thereof; coarse control means responsive to said coarse and reference waveforms for changing the controlled variable until it closely approaches the value represented by said number; and fine control means responsive to said fine and reference waveforms for changing the controlled variable until it agrees with the value represented by said number.

16. Digital control apparatus comprising, in combination, a first and a reference counting channel each having the same counting ratio, each said counting channel including a decade scaling electron discharge tube having ten targets respectively representing the digits 0 through 9, each said channel further including a flip-flop device driven by output pulses produced at the 0 target of the associated scaling tube, a source of command signals digitally representing a number, means for setting the tube in the first channel for conduction by a target corresponding to the value of a decimal digit in said number, means for setting the tube in the reference channel for conduction by the 0 target, and means for supplying identical recurring input signals to the inputs of both said counting channels, whereby the flip-flops in such channels respectively produce recurring symmetrical first and reference waveforms separated in phase by an angle corresponding to said number.

17. The combination set forth in claim 16, further characterized by an additional flip-flop device driven by output pulses produced at the 5 target of the scaling tube in said reference channel, so that the symmetrical waveform produced by such additional flip-flop is constantly separated by a 90° phase angle from the said reference waveform.

References Cited in the file of this patent

UNITED STATES PATENTS

| | | |
|---|---|---|
| 2,860,292 | Towner | Nov. 11, 1958 |
| 2,894,254 | Mork | July 7, 1959 |
| 2,896,198 | Bennett | July 21, 1959 |
| 2,913,635 | Leonard | Nov. 17, 1959 |
| 2,913,638 | Bockemuehl | Nov. 17, 1959 |
| 2,922,940 | Mergler | Jan. 26, 1960 |
| 2,943,248 | Ritchey | June 28, 1960 |
| 3,011,110 | Ho et al. | Nov. 28, 1961 |
| 3,078,400 | Kilroy et al. | Feb. 19, 1963 |
| 3,079,522 | McGorrell | Feb. 26, 1963 |

OTHER REFERENCES

Greenwood, Holdam Marcroe, Electronic Instruments, pages 476, 477; McGraw-Hill, New York, 1948.